(12) United States Patent
Mizuno et al.

(10) Patent No.: US 11,731,114 B2
(45) Date of Patent: Aug. 22, 2023

(54) FLUID CATALYTIC CRACKING CATALYST FOR HYDROCARBON OIL

(71) Applicant: JGC Catalysts and Chemicals Ltd., Kawasaki (JP)

(72) Inventors: Takaki Mizuno, Kitakyushu (JP); Chisuzu Tanaka, Kitakyushu (JP); Tomohiro Mitsui, Kitakyushu (JP)

(73) Assignee: JGC CATALYSTS AND CHEMICALS LTD., Kanagawa (JP)

( * ) Notice: Subject to any disclaimer, the term of this patent is extended or adjusted under 35 U.S.C. 154(b) by 144 days.

(21) Appl. No.: 17/267,976

(22) PCT Filed: Jul. 22, 2019

(86) PCT No.: PCT/JP2019/028636
§ 371 (c)(1),
(2) Date: Feb. 11, 2021

(87) PCT Pub. No.: WO2020/044859
PCT Pub. Date: Mar. 5, 2020

(65) Prior Publication Data
US 2021/0316283 A1    Oct. 14, 2021

(30) Foreign Application Priority Data

Aug. 29, 2018 (JP) .................... 2018-160535
Feb. 28, 2019 (JP) .................... 2019-036268
Jun. 21, 2019 (JP) .................... 2019-115303

(51) Int. Cl.
| | | |
|---|---|---|
| *B01J 29/70* | (2006.01) | |
| *B01J 29/08* | (2006.01) | |
| *B01J 37/00* | (2006.01) | |
| *B01J 37/30* | (2006.01) | |
| *B01J 35/10* | (2006.01) | |
| *B01J 37/06* | (2006.01) | |
| *B01J 37/08* | (2006.01) | |
| *B01J 35/00* | (2006.01) | |
| *C10G 11/05* | (2006.01) | |
| *C10G 11/18* | (2006.01) | |
| *B01J 29/80* | (2006.01) | |

(52) U.S. Cl.
CPC .......... *B01J 29/088* (2013.01); *B01J 29/80* (2013.01); *B01J 35/0006* (2013.01); *B01J 35/1014* (2013.01); *B01J 35/1019* (2013.01); *B01J 35/1038* (2013.01); *B01J 35/1061* (2013.01); *B01J 37/009* (2013.01); *B01J 37/0009* (2013.01); *B01J 37/0045* (2013.01); *B01J 37/06* (2013.01); *B01J 37/08* (2013.01); *B01J 37/30* (2013.01); *C10G 11/05* (2013.01); *C10G 11/18* (2013.01); *C10G 2300/1059* (2013.01); *C10G 2300/70* (2013.01); *C10G 2400/02* (2013.01); *C10G 2400/26* (2013.01)

(58) Field of Classification Search
CPC ...... B01J 29/084; B01J 29/085; B01J 29/088; B01J 29/80; B01J 2229/16; B01J 2229/18; B01J 2229/186; B01J 2229/20; B01J 2229/37; B01J 2229/36; B01J 2229/42; B01J 35/0006; B01J 35/1014; B01J 35/1019; B01J 35/1038; B01J 35/1061; B01J 37/0009; B01J 37/0045; B01J 37/009; B01J 37/06; B01J 37/08; B01J 37/30; C10G 11/05; C10G 11/08; C10G 2300/1059; C10G 2400/02; C10G 2400/26
USPC .......... 502/60, 63, 64, 65, 67, 68, 69, 73, 79
See application file for complete search history.

(56) References Cited

U.S. PATENT DOCUMENTS

| | | |
|---|---|---|
| 6,776,899 B2 | 8/2004 | Lam et al. |
| 2006/0199725 A1 | 9/2006 | Du et al. |
| 2010/0270210 A1 | 10/2010 | Long et al. |
| 2014/0080697 A1 | 3/2014 | Long et al. |
| 2015/0202605 A1* | 7/2015 | Hayashi ................ B01J 29/088 502/65 |

FOREIGN PATENT DOCUMENTS

| | | |
|---|---|---|
| JP | 2004528963 A | 9/2004 |
| JP | 2006503689 A | 2/2006 |
| JP | 2009000657 A | 1/2009 |
| JP | 2010082547 A | 4/2010 |
| JP | 2010110698 A | 5/2010 |
| JP | 2010531219 A | 9/2010 |
| JP | 2014038934 A | 2/2014 |
| JP | 2015533637 A | 11/2015 |

(Continued)

OTHER PUBLICATIONS

Wallenstein et al., "The dependence of ZSM-5 additive performance on the hydrogen-transfer activity of the REUSY base catalyst in fluid catalytic cracking", Applied Catalysis A: General 214, 2001, pp. 11-29.*

Vogt et al., "Fluid catalytic cracking: recent developments on the grand old lady of zeolite catalysis", Chem. Soc. Rev., 2015, 44, pp. 7342-7370.*

Wallenstein et al., "The dependence of ZSM-5 aditive performance on the hydrogen-transfer activity of the REUSY base catalyst in fluid catalytic cracking", Applied Catalysis A; General 214, 2001, pp. 11-29.*

(Continued)

Primary Examiner — Elizabeth D Wood
(74) Attorney, Agent, or Firm — Ratnerprestia

(57) ABSTRACT

A fluid catalytic cracking catalyst for hydrocarbon oil that is a blend of two types of fluid catalytic cracking catalysts each of which has a different hydrogen transfer reaction activity or has a pore distribution within a specific range after being pseudo-equilibrated. One catalyst is a catalyst containing a zeolite and matrix components, and the other catalyst is a catalyst containing a zeolite and matrix components. This catalyst is composed of the one catalyst and the other catalyst blended at a mass ratio within a range of 10:90 to 90:10.

15 Claims, 4 Drawing Sheets

(56) References Cited

FOREIGN PATENT DOCUMENTS

| JP | 2017087204 A | 5/2017 |
|----|--------------|--------|
| WO | 02066163 A2 | 8/2002 |
| WO | 2009145311 A1 | 12/2009 |

OTHER PUBLICATIONS

International Search Report and Written Opinion for International Application No. PCT/JP2019/028636, dated Sep. 17, 2019, 8 pages.
Japanese Notice of Reasons for Refusal for Japanese Application No. 2018-160535, dated Apr. 5, 2022, with translation, 8 pages.
Japanese Notice of Reasons for Refusal for Japanese Application No. 2019-115303, dated May 27, 2022, with translation, 5 pages.
Indian Examination Report for Indian Application No. 202127006650, dated Jul. 21, 2022, with translation, 6 pages.

* cited by examiner

FLUID CATALYTIC CRACKING CATALYST FOR HYDROCARBON OIL

CROSS REFERENCE TO RELATED APPLICATIONS

This is the U.S. National Phase application of PCT/JP2019/028636, filed Jul. 22, 2019, which claims priority to Japanese Patent Application No. 2018-160535, filed Aug. 29, 2018, Japanese Patent Application No. 2019-036268, filed Feb. 28, 2019, and Japanese Patent Application No. 2019-115303, filed Jun. 21, 2019, the disclosures of each of these applications being incorporated herein by reference in their entireties for all purposes.

FIELD OF THE INVENTION

The present invention relates to a fluid catalytic cracking catalyst for hydrocarbon oil that is excellent in selectivity in terms of a high liquid yield, low gas content, etc. and also effective in reducing coke formation and enhancing heavy oil cracking performance.

BACKGROUND OF THE INVENTION

Generally, catalytic cracking catalysts are demanded to deliver high performance from various perspectives, such as that the ability of cracking heavy hydrocarbon oil, including reduced crude, (also called a "bottom cracking capability") is high and that the amount of coke depositing on the catalyst surface is small. In this regard, methods for fluid catalytic cracking of hydrocarbon oil have been hitherto proposed that, for example, use a blend of two different types of catalysts to reduce the coke yield and increase the yields of gasoline and middle distillates (light oil and kerosene) etc. (achieve high liquid yields).

For example, Patent Literature 1 discloses a cracking catalyst used for fluid catalytic cracking of hydrocarbon oil that is composed of two types of catalysts physically blended at a ratio of 1:9 to 9:1. One catalyst is a zeolite-containing cracking catalyst, and the other catalyst is a catalyst that has a higher average pore volume in a pore diameter range of 20 to 200 Å (2 to 20 nm) than the one catalyst does in the same pore diameter range and that contains no M41S substances.

Patent Literature 2 discloses a fluid catalytic cracking catalyst for hydrocarbon oil that is a blend of two or more types of catalysts each containing a zeolite and an inorganic oxide matrix that is composed of active matrix components and inactive matrix components. This fluid catalytic cracking catalyst for hydrocarbon oil is characterized in that each catalyst contains a different amount of zeolite.

Patent Literature 3 discloses a fluid catalytic cracking catalyst that is composed of two catalysts, one containing a zeolite and 10 to 30 mass % of a silica-based binder as a binding agent and the other containing a zeolite and 10 to 30 mass % of an aluminum compound binder as a binding agent, blended at a mass ratio within a range of 10:90 to 90:10. Therefore, the catalyst is excellent in coke reduction and the bottom (heavy distillate) cracking capability.

Patent Literature 4 discloses a hydrocarbon catalytic cracking catalyst that is a blend of a catalyst (a) containing a faujasite-type zeolite (A) having a lattice constant within a range of 2.435 to 2.455 nm, matrix components, and a rare earth; and a catalyst (b) containing a faujasite-type zeolite (B) having a lattice constant within a range of 2.445 to 2.462 nm, matrix components, phosphorus, and magnesium. Accordingly, the catalyst contains only a small amount of rare-earth oxide and yet has excellent hydrothermal stability and a high residual oil (bottom) cracking capability as well as is excellent in selectivity (high liquid yield, low gas content, and low coke content).

PATENT LITERATURE

Patent Literature 1: JP-A-2004-528963
Patent Literature 2: JP-A-2010-110698
Patent Literature 3: WO 2009/145311
Patent Literature 4: JP-A-2014-36934

SUMMARY OF THE INVENTION

The problem, however, is that in reality these conventional fluid catalytic cracking catalysts cannot achieve a satisfactory low coke content. For example, the fluid catalytic cracking catalysts described in Patent Literatures 1 to 3 do not always prove fully effective. As to the fluid catalytic cracking catalyst described in Patent Literature 4, which is a blend of zeolites with different lattice constants, blending the catalysts may not be effective depending on the hydrogen transfer reaction activities of the catalysts to be blended. Moreover, since one of the catalysts contains no rare earths, the hydrothermal resistance is low and a sufficient catalytic activity cannot be produced.

Having been contrived in view of the circumstances surrounding the conventional materials, the present invention aims to provide a fluid catalytic cracking catalyst for hydrocarbon oil that is effective in reducing coke formation and excellent in selectivity (product yields of gasoline etc.).

Against this technical background, the present inventors worked vigorously on a solution to the above-described problems, and as a result, found that blending catalysts each having a different hydrogen transfer reaction activity or a specific pore distribution (pore size and pore volume distribution) can reduce coke formation and increase the yields of high-value-added products, which led us to develop the present invention.

The present invention developed to solve the problems and achieve the above object is as follows: First, a fluid catalytic cracking catalyst for hydrocarbon oil excellent in product yield according to embodiments of the present invention is a fluid catalytic cracking catalyst for hydrocarbon oil that is a blend of two types of fluid catalytic cracking catalysts each of which has a different hydrogen transfer reaction activity or has a pore distribution within a specific range after being pseudo-equilibrated. One catalyst is a catalyst containing a zeolite and matrix components, and the other catalyst is a catalyst containing a zeolite and matrix components, at least one of which is different from the zeolite or the matrix components of the one catalyst. The fluid catalytic cracking catalyst is composed of the one catalyst and the other catalyst blended at a mass ratio within a range of 10:90 to 90:10.

In the fluid catalytic cracking catalyst for hydrocarbon oil according to embodiments of the present invention that is a blend of two types of fluid catalytic cracking catalysts each having a different hydrogen transfer reaction activity, the following specifications can be considered as a preferred possible solution:

one catalyst is a catalyst (1) containing a faujasite-type zeolite (A) having a lattice constant within a range of 2.435 to 2.459 nm, matrix components, and a rare earth; the other catalyst is a catalyst (2) containing a faujasite-type zeolite (B) having a lattice constant within a range of 2.440 to 2.478 nm, matrix components, and a rare earth; and the hydrogen transfer reaction activity of the catalyst (1) is lower than the hydrogen transfer reaction activity of the catalyst (2).

In the fluid catalytic cracking catalyst for hydrocarbon oil according to embodiments of the present invention, the following specifications can be considered as a more preferred possible solution:

(i) A difference between the catalyst (1) and the catalyst (2) in an (i–C4/C4=) ratio (where i–C4 and C4= represent the masses of isobutane and butene, respectively, generated in a test that evaluates performance in fluid catalytic cracking of hydrocarbon oil) that is an index of the hydrogen transfer reaction activity is within a range of 0.10 to 0.85;

(ii) The catalyst (1) contains 15 to 60 mass % of the faujasite-type zeolite (A) based on the catalyst composition, and the catalyst (2) contains 15 to 60 mass % of the faujasite-type zeolite (B) based on the catalyst composition; and (iii) The catalyst (1) contains 0.5 to 2.0 mass % of the rare earth as $RE_2O_3$ based on the catalyst composition, and the catalyst (2) contains 0.5 to 12 mass % of the rare earth as $RE_2O_3$ based on the catalyst composition.

In the fluid catalytic cracking catalyst for hydrocarbon oil according to embodiments of the present invention that is a blend of two types of fluid catalytic cracking catalysts, the following specifications can be considered as a preferred possible solution:

one catalyst is a catalyst (3) that has, after being pseudo-equilibrated, a pore distribution in which a ratio (PV1/PV2) of a volume (PV1) of pores having a pore size not smaller than 4 nm nor larger than 50 nm to a volume (PV2) of pores having a pore size larger than 50 nm is lower than 0.8; the other catalyst is a catalyst (4) that has, after being pseudo-equilibrated, a pore distribution in which (a) a ratio (PV1/PV2) of a volume (PV1) of pores having a pore size not smaller than 4 nm nor larger than 50 nm to a volume (PV2) of pores having a pore size larger than 50 nm is not lower than 0.8, and (b) a ratio (PV4/PV3) of a volume (PV4) of pores having a pore size not smaller than 30 nm nor larger than 100 nm to a volume (PV3) of pores having a pore size larger than 4 nm is lower than 0.2; and the fluid catalytic cracking catalyst is composed of the catalyst (3) and the catalyst (4) blended at a ratio of 100 parts by mass of the former to 10 to 200 parts by mass of the latter.

In the fluid catalytic cracking catalyst for hydrocarbon oil according to embodiments of the present invention, the following specifications can be considered as a more preferred possible solution:

(iv) The catalyst (3) contains a zeolite and a silica-based binder as a binding agent, and contains 15 to 60 mass % of the zeolite and 5 to 30 mass % of the silica-based binder based on the catalyst composition, and the catalyst (4) contains a zeolite and an aluminum compound binder as a binding agent, and contains 15 to 60 mass % of the zeolite and 5 to 30 mass % of the aluminum compound binder based on the catalyst composition;

(v) the silica-based binder is one or more than one of silica sol, water glass, and an acidic silicate solution;

(vi) the aluminum compound binder contains one type selected from the following (a) to (c): (a) basic aluminum chloride, (b) aluminum biphosphate, and (c) alumina sol;

(vii) the zeolites contained in the catalyst (3) and the catalyst (4) are of one or more than one of the following types: FAU (faujasite), MFI, CHA, and MOR;

(viii) the FAU-type zeolite is one of a hydrogen Y-type zeolite (HY), an ultra-stable Y-type zeolite (USY), a rare-earth-exchanged Y-type zeolite (REY), and a rare-earth-exchanged ultra-stable Y-type zeolite (REUSY); and (ix) The catalyst (3) and the catalyst (4) contain clay mineral other than the zeolite and the binding agent.

Second, the fluid catalytic cracking catalyst for hydrocarbon oil excellent in the heavy oil cracking performance according to embodiments of the present invention is a fluid catalytic cracking catalyst for hydrocarbon oil that is used by being blended with other catalyst. This fluid catalytic cracking catalyst has, after being pseudo-equilibrated, a pore distribution in which: (a) a ratio (PV1/PV2) of a volume (PV1) of pores having a pore size not smaller than 4 nm nor larger than 50 nm to a volume (PV2) of pores having a pore size larger than 50 nm is not lower than 0.8; and (b) a ratio (PV4/PV3) of a volume (PV4) of pores having a pore size not smaller than 30 nm nor larger than 100 nm to a volume (PV3) of pores having a pore size larger than 4 nm is lower than 0.2.

In the fluid catalytic cracking catalyst for hydrocarbon oil according to embodiments of the present invention, the following specifications can be considered as a more preferred possible solution:

(x) The catalyst contains a zeolite and an aluminum compound binder as a binding agent, and contains 15 to 60 mass % of the zeolite and 5 to 30 mass % of the aluminum compound binder based on the catalyst composition;

(xi) The aluminum compound binder contains one type selected from the following (a) to (c): (a) basic aluminum chloride, (b) aluminum biphosphate, and (c) alumina sol;

(xii) The zeolite contained in the catalyst is of one or more than one of the following types: FAU (faujasite), MFI, CHA, and MOR;

(xiii) The FAU-type zeolite is one of a hydrogen Y-type zeolite (HY), an ultra-stable Y-type zeolite (USY), a rare-earth-exchanged Y-type zeolite (REY), and a rare-earth-exchanged ultra-stable Y-type zeolite (REUSY); and (xiv) The catalyst contains clay mineral other than the zeolite and the binding agent.

As has been described above, the fluid catalytic cracking catalyst for hydrocarbon oil according to embodiments of the present invention is a blend of two types of fluid catalytic cracking catalysts each of which has a different hydrogen transfer reaction activity or has a pore distribution within a specific range after being pseudo-equilibrated, whereby a fluid catalytic cracking catalyst for hydrocarbon oil that can reduce the coke yield and has excellent selectivity (product yields of gasoline etc.) can be provided. Selecting a catalyst excellent in the heavy oil cracking performance as one catalyst can further enhance the heavy oil cracking performance.

DETAILED DESCRIPTION OF EMBODIMENTS OF THE INVENTION

Figure 1:
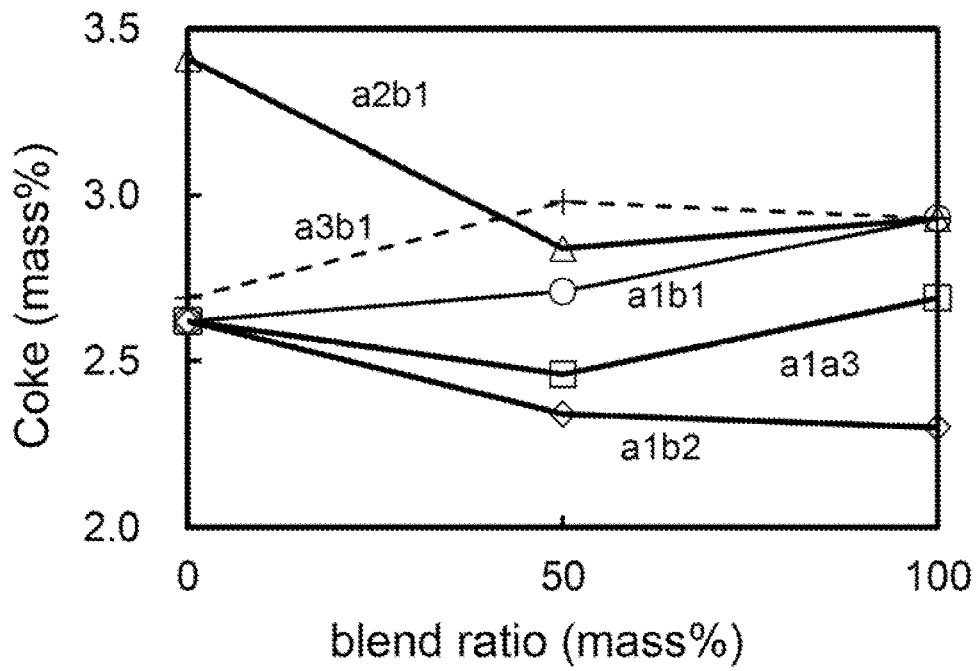
FIG. 1 is a graph showing how blend ratios of catalysts according to one embodiment of the present invention influence a coke yield.

The fluid catalytic cracking catalyst for hydrocarbon oil according to embodiments of the present invention (hereinafter referred to simply as "the subject catalyst") is prepared by blending two types of fluid catalytic cracking catalysts each of which has a different hydrogen transfer reaction activity or has a pore distribution within a specific range after being pseudo-equilibrated. In the following, each catalyst will be described in detail. Both catalysts need to function as a fluid catalytic cracking catalyst for hydrocarbon oil. First, items that apply commonly to both catalysts will be described.

<Catalyst Composition>

Each catalyst according to embodiments of the present invention contains a zeolite and matrix components.

[Matrix Components]

The matrix components constituting part of the subject catalyst refer to components other than a zeolite component. As such matrix components, hitherto commonly known inorganic oxides and inorganic compounds, such as silica, alumina, silica-alumina, aluminum phosphate, silica-magnesia, alumina-magnesia, and silica-magnesia-alumina, can be used. The matrix components also include materials called a binding agent, a filler, and a metal scavenger.

Specifically, hitherto commonly known inorganic oxides and inorganic compounds derived from silica gel, silica sol, silica hydrosol, alumina gel, alumina sol, silica-alumina gel, silica-alumina sol, an aluminum phosphate compound, etc. can be used. Among them, silica sol, silica hydrosol, alumina sol, silica-alumina sol, an aluminum phosphate compound, etc. can be suitably used, because these materials function also as a carrier (base material) or a binding agent of a faujasite-type zeolite and serve to produce a hydrocarbon catalytic cracking catalyst that is excellent in catalytic activity, abrasion resistance, etc. as well as in residual oil cracking activity, metal resistance, etc.

[Binding Agent]

As a binding agent (binder component), a silica-based binder, such as silica sol, or an aluminum compound binder, such as basic aluminum chloride, can be used. As the silica-based binder of these binders, other than silica sol, colloidal silica of sodium type, lithium type, acid type, etc. can also be used. Among them, silica sol is suitable. As the aluminum compound binder, other than basic aluminum chloride, particles obtained by dissolving an aluminum biphosphate solution, gibbsite, bayerite, boehmite, bentonite, crystalline alumina, etc. in an acid solution; boehmite gel; particles obtained by dispersing amorphous alumina gel in an aqueous solution; and alumina sol can also be used. These materials can be used alone, in a blended form, or as a composite material.

The content of the binding agent is preferably 5 to 30 mass %. The content is more preferably 10 to 25 mass %. This is because if the content of the binding agent is lower than 5 mass %, the catalytic cracking activity increases but sufficient strength against attrition (abrasion) of the catalytic may not be maintained. On the other hand, if the content is higher than 30 mass %, a sufficient catalytic cracking activity may not be produced.

[Filler]

As a filler, clay mineral, such as kaolin, bentonite, kaolinite, halloysite, and montmorillonite, can be contained. The subject catalyst can contain 15 to 45 mass % of clay mineral as a filler. This is because if the content of clay mineral is lower than 15 mass %, excessive coke formation occurs due to the large amount of active components and the catalyst may fail to deliver sufficient performance. On the other hand, if the content exceeds 45 mass %, the amount of solid acid in the catalyst may become so small that the catalytic activity decreases.

[Metal Scavenger]

As the metal scavenger, alumina particles, phosphorus-alumina particles, crystalline calcium aluminate, sepiolite, barium titanate, calcium stannate, strontium titanate, manganese oxide, magnesia, magnesia-alumina, calcium carbonate, etc. can be used. As the raw material of the metal scavenger, a precursor material, such as boehmite that becomes alumina etc. by baked in an oxidizing atmosphere, can be used. When the subject catalyst contains a metal scavenger, the content is desirably within a range of 0.1 to 10 mass % and more preferably within a range of 0.1 to 5 mass %.

<Pseudo-Equilibration Treatment>

When the performance of a fluid catalytic cracking catalyst for hydrocarbon oil is evaluated using a reactor in a laboratory, a treatment called pseudo-equilibration is performed as a preliminary treatment. Pseudo-equilibration is a treatment in which metal, such as V or Ni, is supported in a fluid catalytic cracking catalyst and the catalyst is subjected to a steaming treatment to thereby reduce the catalytic activity to a level equivalent to that of an equilibrium catalyst. Reproducing the properties of an equilibrium catalyst by this pseudo-equilibration treatment is important for evaluating the catalytic activity with higher accuracy.

<Measurement of Specific Surface Area>

The specific surface area of the pseudo-equilibrated catalyst is measured by the BET method using, for example, Macsorb HM model-1200 manufactured by Mountech Co. The specific surface area of the matrix components is obtained by measuring a nitrogen adsorption isotherm using, for example, BELSORP-mini II manufactured by Microtrac-BEL, and plotting a Va-vs-t graph based on the obtained adsorption-side isotherm. The specific surface area of the zeolite component can be obtained by subtracting the specific surface area of the matrix components from the total specific surface area. In the present invention, the specific surface area (SA) of the entire catalyst is preferably within a range of 100 to 250 $m^2/g$. The specific surface area of the matrix components is preferably not smaller than 30 $m^2/g$ and more preferably not smaller than 50 $m^2/g$.

First Embodiment

The subject catalyst according to a first embodiment of the present invention that is a blend of two types of fluid catalytic cracking catalysts each having a different hydrogen transfer reaction activity will be described. In particular, it is preferable that one catalyst be a catalyst (1) containing a predetermined faujasite-type zeolite (A), matrix components, and a rare earth; that the other catalyst be a catalyst (2) containing a predetermined faujasite-type zeolite (B), matrix components, and a rare earth; and that the hydrogen transfer reaction activity of the catalyst (1) be lower than the hydrogen transfer reaction activity of the catalyst (2). In the following, this embodiment will be described in detail.

<Composition of Catalyst (1)>

The catalyst (1) constituting this embodiment contains a predetermined faujasite-type zeolite (A), matrix components, and a rare earth, and this catalyst itself also functions as a fluid catalytic cracking catalyst for hydrocarbon oil. Each of these components will be described in detail below.

[Faujasite-Type Zeolite (A)]

A faujasite-type zeolite is a zeolite having a skeleton composed of $SiO_2$ and $Al_2O_3$. The mole ratio $(M_S)/(M_A)$ between the mole numbers $(M_S)$ and $(M_A)$ of $SiO_2$ and $Al_2O_3$, respectively, that compose the skeleton is preferably within a range of 5 to 20 and more preferably within a range of 6 to 15. When the mole ratio $(M_S)/(M_A)$ is within this range, the hydrothermal resistance (the ratio of catalytic activity maintained after the catalyst is subjected to a regeneration treatment at high temperature) becomes higher, and the catalytic activity and the gasoline selectivity also becomes higher.

If the mole ratio $(M_S)/(M_A)$ is low, the hydrothermal resistance, the catalytic activity, and the gasoline selectivity may become insufficient. In this case, in a fluid catalytic cracking process in which carbonaceous matter having deposited on the catalyst after cracking reactions is combusted and removed in a regeneration tower to regenerate the catalyst, the catalyst reaches a high temperature due to the heat of combustion and, as the carbonaceous matter contains hydrogen, water is generated. As a result, the catalyst is hydrothermally processed at high temperature, and the crystallinity of the zeolite is known to decrease in the process. On the other hand, if the mole ratio $(M_S)/(M_A)$ is too high, the hydrothermal resistance becomes high but the catalytic activity may become insufficient, probably due to a reduced number of active sites.

The lattice constant (UCS) of the faujasite-type zeolite (A) is 2.435 to 2.459 nm and preferably 2.440 to 2.450 nm. When the lattice constant is within such a range, the gasoline selectivity become extremely high. If the lattice constant is too low, the catalytic activity may become insufficient. On the other hand, if the lattice constant is too high, the hydrothermal resistance and the metal resistance may become insufficient. The above-mentioned lattice constant can be obtained by measuring the spacing between diffraction planes (553) and (642) of the zeolite obtained by the X-ray diffraction method using anatase $TiO_2$ as a standard sub stance.

As such a faujasite-type zeolite (A), an $NH_4$ Y zeolite obtained by performing $NH_4$ ion exchange on an Na Y-type zeolite can be preferably used, and an ultra-stable Y-type zeolite (USY) obtained by performing a hydrothermal treatment on an $NH_4$ Y-type zeolite is especially preferable.

The content $(C_{ZA})$ of the faujasite-type zeolite (A) in the catalyst (1) as solid matter (mainly $SiO_2$ and $Al_2O_3$) is preferably within a range of 15 to 60 mass % and further within a range of 15 to 40 mass %. If the content of the faujasite-type zeolite (A) as solid matter is lower than 15 mass %, the catalytic activity may become insufficient due to the low content of the zeolite. If the content of the faujasite-type zeolite (A) as solid matter exceeds 60 mass %, the catalytic activity becomes so high that excessive cracking may occur and the selectivity may decrease. Moreover, as the content of the matrix components other than the zeolite decreases, the abrasion resistance becomes insufficient, so that the catalyst may easily pulverize and scatter when used as a fluid catalytic cracking catalyst. While the replenish amount of the catalyst can be increased to make up for this, it is economically problematic.

[Matrix Components]

The matrix components constituting part of the catalyst (1) refer to components other than the faujasite-type zeolite (A), and suitably include the above-described binding agent, filler, and metal scavenger that are common in the subject catalyst.

The catalyst (1) preferably contains active alumina. In this case, the content of active alumina as solid matter $(Al_2O_3)$ is preferably within a range of 1 to 30 mass % and further within a range of 2 to 20 mass %. When the catalyst (1) contains active alumina within this range, the catalyst (1) becomes highly effective in enhancing the gasoline selectivity as well as excellent in residual oil cracking activity and metal resistance.

The content of the matrix components in the catalyst (1) as solid matter is preferably within a range of 40 to 85 mass % and further within a range of 50 to 80 mass %.

If the content of the matrix components as solid matter is low, the ratio of the faujasite-type zeolite (A) may become so high that, while the catalytic activity increases, the bulk density becomes too low or the abrasion resistance, fluidity, etc. may become insufficient, making the catalyst (1) impractical as a hydrocarbon catalytic cracking catalyst, especially as a hydrocarbon fluid catalytic cracking catalyst. On the other hand, if the content of the matrix components as solid matter is too high, the ratio of the faujasite-type zeolite (A) that is a main active component becomes low, so that the cracking activity may become insufficient.

[Rare Earth]

The catalyst (1) further contains a rare earth as a component. The content $(C_{REA})$ of the rare earth is preferably 0.5 to 2.0 mass % and more preferably 1.0 to 2.0 mass % as $RE_2O_3$ based on the catalyst composition. By containing a rare earth, the catalyst can become excellent in cracking activity and selectivity of gasoline etc. Examples of the rare earth include a rare earth metal, such as lanthanum, cerium, and neodymium, and a mixture of these metals. Usually, a rare-earth mixture consisting mainly of lanthanum and cerium is used. The rare earth may be introduced by ion exchange after catalyst particles are manufactured, or ion exchange with the rare earth may be performed on the faujasite-type zeolite (A) in advance.

If the content of the rare earth is low, the cracking activity, selectivity, hydrothermal resistance, metal resistance, etc. may become insufficient. In embodiments of the present invention, an upper limit of the content of the rare earth is specified so as to compose the catalyst (1) as a catalyst having a low hydrogen transfer reaction activity as will be described later.

<Manufacturing Method of Catalyst (1)>

One example of a preferred manufacturing method of the catalyst (1) will be shown below.

1. Preparation Step

The aforementioned silica sol (one example of the silica-based binder), kaolin, and active alumina powder are added to a liquid for forming slurry (e.g., pure water), and further slurry of an ultra-stable Y-type zeolite with its pH adjusted to 3.9 by sulfuric acid is added to this liquid. Thus, a slurry mixture is prepared. A composition of additives that is ascertained in advance to produce a predetermined hydrogen transfer reaction activity is used.

2. Spray-Drying, Cleaning, and Drying Steps

The slurry mixture is spray-dried to obtain spherical particles. The obtained spherical particles are cleaned and then brought into contact with an aqueous solution of rare earth metal (RE) chloride. After ion exchange is performed so as to achieve 0.5 to 2.0 mass % as $RE_2O_3$, the particles are dried. Thus, the catalyst (1) is obtained. The average particle size of the obtained catalyst (1) is not particularly limited as long as it is within such a range that the catalyst (1) can be blended with the catalyst (2) to be described later. However, from the perspective of the effects of the present invention, the average particle size is preferably within a range of 40 to 100 μm and further within a range of 50 to 80 μm.

<Composition of Catalyst (2)>

The catalyst (2) constituting this embodiment is a catalyst containing a predetermined faujasite-type zeolite (B), matrix components, and a rare earth, and this catalyst itself also functions as a fluid catalytic cracking catalyst for hydrocarbon oil. Each of these components will be described in detail below.

[Faujasite-Type Zeolite (B)]

The lattice constant (UCS) of the faujasite-type zeolite (B) constituting part of the catalyst (2) is characterized by being within a range of 2.440 to 2.478 nm. A preferable range of the lattice constant is 2.447 to 2.460 nm. When the lattice constant is within such a range, the gasoline selectivity becomes extremely high. If the lattice constant is too low, the catalytic activity may become insufficient. On the other hand, if the lattice constant is too high, the hydrothermal resistance and the metal resistance may become insufficient. Other characteristics, including a preferred structure, are exactly the same as those of the faujasite-type zeolite (A) constituting part of the catalyst (1).

As such a faujasite-type zeolite (B), an $NH_4$ Y-type zeolite obtained by performing $NH_4$ ion exchange on an Na Y-type zeolite can be preferably used, and an ultra-stable Y-type zeolite (USY) obtained by performing a hydrothermal treatment on an $NH_4$ Y-type zeolite is especially preferable. Alternatively, the faujasite-type zeolite (B) may be a rare-earth-exchanged Y-type zeolite (REY) or a rare-earth-exchanged ultra-stable Y-type zeolite (REUSY) obtained by supporting a rare earth metal by ion exchange etc.

The content ($C_{ZB}$) of the faujasite-type zeolite (B) in the catalyst (2) as solid matter (mainly $SiO_2$ and $Al_2O_3$) is preferably within a range of 15 to 60 mass % and further within a range of 15 to 40 mass %. If the content of the faujasite-type zeolite (B) as solid matter is lower than 10 mass %, the catalytic activity may become insufficient due to the low content of the zeolite. If the content of the faujasite-type zeolite (B) as solid matter exceeds 50 mass %, the catalytic activity may become so high that excessive cracking may occur and the selectivity may decrease. Moreover, as the content of the matrix components other than the zeolite decreases, the abrasion resistance becomes insufficient, so that the catalyst may easily pulverize and scatter when used as a fluid catalyst. While the refill amount of the catalyst can be increased to make up for this, it is economically problematic.

[Matrix Components]

As the matrix components, basically the same components as the matrix components constituting part of the catalyst (1) are preferably used.

The content of the matrix components in the catalyst (2) as solid matter is preferably within a range of 40 to 85 mass % and further within a range of 50 to 80 mass % based on the catalyst composition.

If the content of the matrix components as solid matter is low, the ratio of the faujasite-type zeolite (B) may become so high that, while the catalytic activity increases, the bulk density becomes too low or the abrasion resistance, fluidity, etc. become insufficient, making the catalyst impractical as a hydrocarbon catalytic cracking catalyst, especially as a hydrocarbon fluid catalytic cracking catalyst. On the other hand, if the content of the matrix components as solid matter is too high, the ratio of the faujasite-type zeolite (B) that is a main active component becomes low, so that the cracking activity may become insufficient.

[Rare Earth]

The catalyst (2) further contains a rare earth as a component. The content ($C_{REB}$) of the rare earth is preferably 0.5 to 12 mass % and more preferably 2.5 to 4.0 mass % as $RE_2O_3$ based on the catalyst composition. By containing a rare earth, the catalyst can become excellent in cracking activity and selectivity of gasoline etc. Examples of the rare earth include rare earth metals, such as lanthanum, cerium, and neodymium, and a mixture of these metals. Usually, a rare-earth mixture consisting mainly of lanthanum and cerium is used.

If the content of the rare earth is low, the cracking activity, selectivity, hydrothermal resistance, metal resistance, etc. may become insufficient. In the present invention, to compose the catalyst (2) as a catalyst having a high hydrogen transfer reaction activity as will be described later, it is preferable that the catalyst (2) has a higher content of the rare earth than the catalyst (1).

<Manufacturing Method of Catalyst (2)>

One example of a manufacturing method of the catalyst (2) will be shown below.

1. Preparation Step

An aqueous solution of the aforementioned basic aluminum chloride (one example of the aluminum compound binder) is diluted with pure water. Kaolin, active alumina powder, and slurry of a rare-earth-exchanged ultra-stable Y-type zeolite are added to this solution, and the resulting solution is thoroughly stirred. Thus, a slurry mixture is prepared. A composition of additives that is ascertained in advance to produce a predetermined hydrogen transfer reaction activity is used.

2. Spray-Drying, Baking, Cleaning, and Drying Steps

The above-described prepared slurry is spray-dried to obtain spherical particles. Then, the obtained dry powder of the spherical particles is baked, suspended in warm water, filtered to dehydrate, poured with warm water, and further dried. Thus, the catalyst (2) is obtained. The average particle size of the obtained catalyst (2) is not particularly limited as long as it is within such a range that the catalyst (2) can be blended with the catalyst (1). However, from the perspective of the effects of the present invention, the average particle size is preferably within a range of 40 to 100 μm and further within a range of 50 to 80 μm.

<Preparation of Catalyst Blend>

The hydrocarbon catalytic cracking catalyst according to this embodiment can be manufactured by blending the above-mentioned catalyst (1) and catalyst (2). A commonly known method can be used as the method of blending these catalysts. The mass blend ratio ((1)/(2)) of the catalyst (1) and the catalyst (2) is preferably within a range of 10/90 to 90/10 and more preferably within a range of 30/70 to 70/30. When the mass blend ratio of the catalyst (1) and the catalyst (2) is within this range, greater effects of the present invention can be exerted. In particular, excellent selectivity is exhibited at the ratio of 50/50. While the subject catalyst is a blend of the above-mentioned specific two types of catalysts, it can also be used by being blended with other components as long as the effects of the present invention are not undermined.

Second Embodiment

Next, the subject catalyst of a second embodiment of the present invention that is a blend of two types of catalysts each having a different pore size and pore volume distribution after being pseudo-equilibrated will be described. In particular, it is preferable that one catalyst be a catalyst (3) having, after being pseudo-equilibrated, a pore distribution in which a ratio (PV1/PV2) of a volume (PV1) of pores having a pore size not smaller than 4 nm nor larger than 50 nm to a volume (PV2) of pores having a pore size larger than 50 nm is lower than 0.8; that the other catalyst be a catalyst (4) having, after being pseudo-equilibrated, a pore distribution in which (a) a ratio (PV1/PV2) of a volume (PV1) of pores having a pore size not smaller than 4 nm nor larger than 50 nm to a volume (PV2) of pores having a pore size larger than 50 nm is not lower than 0.8, and (b) a ratio (PV4/PV3) of a volume (PV4) of pores having a pore size not smaller than 30 nm nor larger than 100 nm to a volume (PV3) of pores having a pore size larger than 4 nm is lower than 0.2; and that the fluid catalytic cracking catalyst be composed of the catalyst (3) and the catalyst (4) blended at a ratio of 100 parts by mass of the former to 10 to 200 parts by mass of the latter. In the following, this embodiment will be described in detail.

<Catalyst Composition>

[Zeolite]

As the zeolite used in this embodiment, a zeolite that is usually used for catalytic cracking catalysts for hydrocarbon oil can be commonly used. For example, the zeolite is of one or more than one of the following types: FAU (faujasite type; e.g., a Y-type zeolite, an X-type zeolite, etc.), MFI (e.g., ZSM-5, TS-1, etc.), CHA (e.g., chabazite, SAPO-34, etc.), and MOR (e.g., mordenite, Ca-Q, etc.), and especially the FAU type is suitable. Examples of faujasite-type zeolites include a hydrogen Y-type zeolite (HY), an ultra-stable Y-type zeolite (USY), and a rare-earth-exchanged Y-type zeolite (REY) and a rare-earth-exchanged ultra-stable Y-type zeolite (REUSY) obtained by supporting a rare earth metal in HY and USY, respectively, by ion exchange etc. In this embodiment, the content of the zeolite is preferably 15 to 60 mass % and more preferably 20 to 50 mass %. The content is even more preferably 20 to 40 mass %. This is because if the content of the zeolite relative to the catalyst is lower than 15%, the catalytic cracking activity tends to decrease, while if the content exceeds 60 mass %, the catalytic cracking activity becomes so high that the amount of coke deposits increases, and moreover, the bulk density increases and the strength decreases.

In this embodiment, a zeolite obtained by ion exchange of a rare earth metal (RE) may be contained. As the rare earth metal, for example, cerium (Ce), lanthanum (La), praseodymium (Pr), and neodymium (Nd) can be used. These metals may be used alone or as a metal oxide of two or more types of metals. These metals may be ones obtained by performing ion exchange on a zeolite, because containing a rare earth metal enhances the hydrothermal resistance of a zeolite. In this embodiment, when a rare earth metal is used, it is contained so as to account for 10.0 mass % or less and preferably account for 0.5 to 5.0 mass % as $RE_2O_3$. Here, addition of $RE_2O_3$ is adjusted such that the $RE_2O_3$/zeolite mass ratio becomes constant in the catalyst.

<Measurement of Pore Size and Pore Volume Distribution>

The pore size and pore volume distribution of the pseudo-equilibrated catalyst is measured by the mercury intrusion technique. The pore size and pore volume distribution are measured using, for example, PoreMaster-60GT manufactured by Quantachrome Instruments as a measurement device. The pore size is a value calculated using a surface tension of mercury of 480 dyne/cm and a contact angle of 150°. The pore volume (PVn) in each pore size range is an integrated value of volumes of pores in each pore diameter range measured by the mercury intrusion technique. In the present invention, the total pore volume (PV) of the catalyst is preferably not smaller than 0.15 ml/g and more preferably within a range of 0.20 to 0.40 ml/g.

Figure 4:
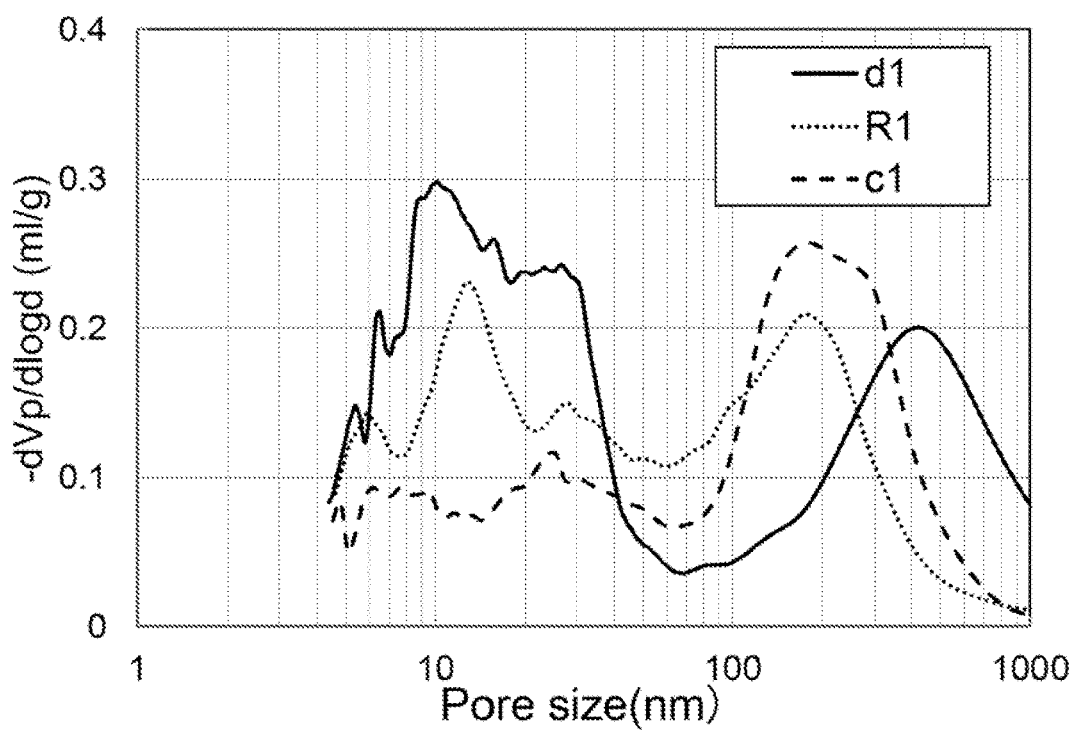
FIG. 4 is a graph showing one example of distributions of a pore size and a log-differentiated pore volume dVp/d log d of catalysts according to another embodiment of the present invention.

FIG. 4 shows one example of pore size and pore volume distributions of catalysts measured by the above-described test. The pore size (nm) and a log-differentiated pore volume dVp/d log d are plotted on the abscissa and the ordinate, respectively. Based on an example to be described later, c1 represents one example of the distribution of the catalyst (3); d1 represents one example of the distribution of the catalyst (4); and R1 represents one example of the distribution of a catalyst of a comparative example in which PV4/PV3 exceeds 0.2.

A desired cracking reaction activity may not be produced when the specific surface area of the fluid catalytic cracking catalyst is too small and the total pore volume is too small. From the perspective of increasing the specific surface area, it is preferable that there be a large number of small-size pores. However, pore sizes smaller than 4 nm contribute little to catalytic cracking of the heavy oil, and therefore pore sizes not smaller than 4 nm are preferable. In catalytic cracking of hydrocarbon oil, from the viewpoint of reactions for reducing the coke yield, pores of the catalyst having a pore diameter larger than 10 nm are desirable, as they improve the diffusibility of reactants. On the other hand, it is desirable that there be a smaller number of pores having a pore diameter larger than 1000 nm, as they may reduce the abrasion resistance of the catalyst.

<Composition of Catalyst (3)>

The catalyst (3) is a main constituent element of the fluid catalytic cracking catalyst according to this embodiment. The characteristics etc. of the catalyst (3) will be described below.

[Pore Distribution]

After being pseudo-equilibrated, the catalyst (3) has a pore distribution (pore size and pore volume distribution) in which a ratio (PV1/PV2) of a volume (PV1) of mesopores having a pore size not smaller than 4 nm nor larger than 50 nm to a volume (PV2) of macropores having a pore size larger than 50 nm is lower than 0.8. This pore structure reduces coke formation. (PV1/PV2) of 0.8 or higher is not preferable, as it diminishes the coke formation reducing effect. If (PV1/PV2) is low, i.e., the catalyst has a large amount of macropores, a decrease in abrasion resistance is feared. Therefore, (PV1/PV2) is preferably within a range of 0.4 to 0.7.

[Components]

From the perspective of reducing coke formation, a silica-based binder alone or a binder composed predominantly of a silica-based binder is preferable as the binding agent of the matrix components. The silica-based binder is added for the purpose of enhancing the abrasion resistance of the catalyst (3) of this embodiment and for the purpose of adjusting the amount of solid acid and the acid strength in the catalyst (3).

<Manufacturing Method of Catalyst (3)>

One example of a preferred manufacturing method of the catalyst (3) will be shown below.

1. Preparation Step

The aforementioned silica sol (one example of the silica-based binder), kaolin, and active alumina powder are added to a liquid for forming slurry (e.g., pure water), and further slurry of an ultra-stable Y-type zeolite with its pH adjusted to 3.9 by sulfuric acid is added to this liquid. Thus, a slurry mixture is prepared. A composition of additives that is ascertained in advance to produce the above-described pore distribution is used.

2. Spray-Drying, Cleaning, and Drying Steps

The slurry mixture is spray-dried to obtain spherical particles. The obtained spherical particles are cleaned and then brought into contact with an aqueous solution of rare earth metal (RE) chloride. After ion exchange is performed so as to achieve 0.5 to 5.0 mass % as $RE_2O_3$, the particles are dried. Thus, the catalyst (3) is obtained. The average particle size of the obtained catalyst (3) is not particularly limited as long as it is within such a range that the catalyst (3) can be blended with the catalyst (4) to be described later. However, the average particle size should be about 50 to 100 μm.

<Composition of Catalyst (4)>

The catalyst (4) is a fluid catalytic cracking catalyst for hydrocarbon oil that is excellent in the heavy oil cracking performance and constitutes the core of the present invention, and exhibits its effects by being blended with the catalyst (1). The characteristics of the catalyst (4) will be described below.

[Pore Distribution]

After being pseudo-equilibrated, the catalyst (4) has a pore size and pore volume distribution in which: (a) a ratio (PV1/PV2) of a volume (PV1) of mesopores having a pore size not smaller than 4 nm nor larger than 50 nm to a volume (PV2) of macropores having a pore size larger than 50 nm is not lower than 0.8; and (b) a ratio (PV4/PV3) of a volume (PV4) of pores having a pore size not smaller than 30 nm nor larger than 100 nm to a volume (PV3) of pores having a pore size larger than 4 nm is lower than 0.2. This pore structure imparts a high heavy distillate cracking capability to the catalyst (4). This is because if (PV1/PV2) is lower than 0.8, the heavy distillate cracking capability becomes insufficient. If (PV1/PV2) is too high, coke formation may increase, and therefore the ratio is desirably not higher than 3.0. If (PV4/PV3) is not lower than 0.2, the catalyst (4) has an insufficient heavy distillate cracking capability when blended with the catalyst (A). While a lower limit of (PV4/PV3) is not particularly specified, this ratio is hardly likely to become lower than 0.03, as it is attributable to the sizes of components contained in the catalyst. It is preferable that (PV1/PV2) be within a range of 1.2 to 2.8 and that (PV4/PV3) be within a range of 0.08 to 0.15.

While the reason why the catalyst blended with the catalyst (3) has the high heavy oil cracking performance when the volume of pores having a pore size not smaller than 30 nm nor larger than 100 nm is reduced is not clear, the present inventors consider as follows.

When the catalyst has many pores that are not smaller than 30 nm nor larger than 100 nm, light cycle oil (LCO) distillates etc. that are intermediate products are more likely to diffuse into particles of the catalyst (4). Therefore, when the catalyst (4) is blended with the catalyst (3), the intermediate products, such as LCO distillates, generated by cracking of heavier oil, such as heavy cycle oil (HCO), are less likely to diffuse from particles (catalyst (4)) to particles (catalyst (3)), so that the catalyst blend cannot produce a sufficient effect.

[Components]

From the perspective of cracking heavy distillates, an aluminum compound binder alone, or a binder composed predominantly of an aluminum compound binder is preferable as the binder component. As the raw material of the aluminum compound binder, for example, basic aluminum chloride ($[Al_2(OH)_nCl_{6-n}]_m$ (where $0<n<6$ and $m\leq10$) can be used. Basic aluminum chloride dissolves at a relatively low temperature of about 200 to 450° C. in the presence of aluminum and cations, such as sodium and potassium, contained in a zeolite etc. As a result, part of the basic aluminum chloride dissolves, and a site where decomposition products, such as aluminum hydroxide, are present seems to be formed near the zeolite. Further, an alumina binder (alumina) is formed by baking the dissolved basic aluminum chloride at a temperature within a range of 300 to 600° C. In this case, when the decomposition products near the zeolite are baked and the basic aluminum chloride becomes an alumina binder, a relatively large amount of mesopores having a pore size not smaller than 4 nm nor larger than 50 nm is formed, which is presumed to increase the specific surface area of the catalyst (B) according to embodiments of the present invention. On the other hand, it is also confirmed that formation of macropores having a pore size larger than 50 nm but not larger than 1000 nm, which reduce the abrasion resistance, is reduced.

As the specific surface area of the zeolite component according to the above-described measurement, 60 to 100 $m^2/g$ is preferable from the viewpoint of cracking heavy distillates.

<Manufacturing Method of Catalyst (4)>

One example of a manufacturing method of the catalyst (4) will be shown below.

1. Preparation Step

An aqueous solution of the aforementioned basic aluminum chloride (one example of the aluminum compound binder) is diluted with pure water. Kaolin, active alumina powder, and slurry of an ultra-stable Y-type zeolite are added to this solution, and after the resulting solution is thoroughly stirred, a lanthanum chloride solution is added. Thus, a slurry mixture is prepared. A composition of additives that is ascertained in advance to produce the above-described pore distribution is used.

2. Spray-Drying, Baking, Cleaning, and Drying Steps

The slurry mixture is spray-dried to obtain spherical particles. Then, the obtained dry powder of the spherical particles is baked, suspended in warm water, filtered to dehydrate, poured with warm water, and further dried. Thus, the catalyst (4) is obtained. The average particle size of the obtained catalyst (4) is not particularly limited as long as it is within such a range that the catalyst (4) can be blended with the catalyst (3). However, the average particle size should be about 50 to 100 μm.

<Preparation of Catalyst Blend>

The fluid catalytic cracking catalyst according to this embodiment is manufactured by first adjusting two types of catalysts each having a different pore size and pore volume distribution that have been pseudo-equilibrated, and then blending these catalysts by a commonly known method. The fluid catalytic cracking catalyst of this embodiment thus obtained is a catalyst composed of the catalyst (3) and the catalyst (4) blended at a ratio of 100 parts by mass of the former to 10 to 200 parts by mass of the latter. If the blend amount of the catalyst (4) is smaller than 10 parts by mass relative to 100 parts by mass of the catalyst (3), the heavy distillate cracking capability becomes insufficient and the gasoline+LPG yield does not increase. On the other hand, if the blend amount exceeds 200 parts by mass, the coke formation reducing effect of the catalyst (3) diminishes and the gasoline+LPG yield decreases. Therefore, the catalyst (3) and the catalyst (4) are blended at a ratio of 100 parts by mass of the former to 10 to 200 parts by mass of the latter. It is preferable that the catalyst (3) and the catalyst (4) be blended at a ratio of 100 parts by mass of the former to 40 to 100 parts by mass of the latter. The blend ratio (mass ratio) of the catalyst (3) and the catalyst (4) should be determined such that decomposition products (especially gasoline and LPG) obtained by cracking hydrocarbon oil by the subject fluid catalytic cracking catalyst have a desired composition (yield).

<Fluid Catalytic Cracking Method>

For a fluid catalytic cracking method using the fluid catalytic cracking catalyst according to embodiments of the present invention, usual conditions for fluid catalytic cracking of hydrocarbon oil can be used, and for example, the following conditions are suitable.

As the raw oil used for catalytic cracking, usual hydrocarbon raw oil, for example, hydrodesulfurized vacuum gas oil (DSVGO) and vacuum gas oil (VGO) can be used. In addition, residual oil, such as atmospheric distillation residue (AR), vacuum distillation residue (VR), desulfurized atmospheric distillation residue (DSAR), desulfurized vacuum distillation residue (DSVR), or deasphaltene oil (DAO), can also be used. These oils can be used alone or as a blend of oils. The fluid catalytic cracking catalyst according to the present invention can also treat residual oil containing 0.5 ppm or more each of nickel and vanadium, and can also be used for residual oil catalytic cracking devices (Resid FCC; RFCC) that use residual oil alone as raw oil. Here, when a conventional fluid catalytic cracking catalyst is used in an RFCC, nickel and vanadium contained in residual oil adhere to the catalyst and reduce the catalytic activity. However, the fluid catalytic cracking catalyst of the present invention can maintain excellent catalytic performance even when treating residual oil that contains 0.5 ppm or more each of vanadium and nickel. Moreover, the fluid catalytic cracking catalyst of the present invention can maintain the catalytic performance even when the content of each of vanadium and nickel is 300 ppm or higher. An upper limit of the content of each of vanadium and nickel in the fluid catalytic cracking catalyst according to embodiments of the present invention is about 10000 ppm.

For catalytic cracking of the above-mentioned hydrocarbon raw oil, a reaction temperature within a range of 470 to 550° C. is suitably used, and a reaction pressure within a range of about 1 to 3 kg/cm² is generally suitable. The catalyst/oil mass ratio (catalyst/oil ratio) is preferably within a range of 2.5 to 9.0, and the contact time is preferably within a range of 10 to 60 hr$^{-1}$.

[Hydrogen Transfer Reaction Activity: Isobutane/Butene (i–C4/C4=) Ratio]

In the present invention, a performance evaluation test of catalysts with the same raw oil and the same reaction conditions is performed using advanced cracking evaluation-micro activity test (ACE-MAT), and the performance is evaluated based on an (i–C4/C4=) ratio that is the ratio between the mass of isobutane and the mass of butene, which are decomposition products, as an index of the hydrogen transfer reaction activity of catalysts. If the difference in the (i–C4/C4=) ratio between the catalyst (1) and the catalyst (2) is within a range of 0.10 to 0.85, a low coke ratio and a low HCO yield are achieved. On the other hand, if the difference is smaller than the lower limit, the HCO yield may become high even when the coke ratio is the same. If the difference is larger than the upper limit, the cracking activity may become too low.

[(Gasoline+LPG Yield) G]

For example, it is preferable that a (gasoline+LPG yield) GM of the fluid catalytic cracking catalyst that is a blend of the catalyst (3) and the catalyst (4) be higher than a (gasoline+LPG yield) GA of the catalyst (3) and a (gasoline+LPG yield) GB of the catalyst (4). Here, the (gasoline+LPG yield) GM is calculated from (mass of gasoline+mass of LPG) obtained by performing catalytic cracking of raw oil by the above-described method, and the mass of the raw oil.

EXAMPLES

In the following, the present invention will be described in further detail using examples. However, the present invention is in no way limited by these examples.

Manufacturing Example 1

<Catalyst a1> a. Preparation Step 2941 g of water glass (SiO$_2$ concentration: 17 mass %) and 1059 g of sulfuric acid (sulfuric acid concentration: 25 mass %) are added simultaneously and continuously to prepare 4000 g of silica sol (one example of the silica-based binder) with an SiO$_2$ concentration of 12.5 mass %. To this silica sol, 893 g of kaolin (solid matter concentration: 84 mass %) and 309 g of active alumina powder (solid matter: 81 mass %) are added, and further 3030 g of slurry of an ultra-stable Y-type zeolite (UCS: 2.443 nm, solid matter concentration: 33 mass %) with its pH adjusted to 3.9 by sulfuric acid is added. Thus, a slurry mixture is prepared.

b. Spray-Drying, Cleaning, and Drying Steps

The slurry mixture is turned into droplets and spray-dried by a spray dryer having an inlet temperature of 230° C. and an outlet temperature of 130° C. to obtain spherical particles with an average particle size of 70 μm. The obtained spray-dried particles are suspended in 10 times their amount by mass of warm water (60° C.) and filtered to dehydrate. Then, the particles are poured with 10 times their amount by mass of warm water (60° C.), further suspended, brought into contact with an aqueous solution of rare earth metal (RE) chloride (containing chlorides of cerium and lanthanum), and ion exchange is performed so as to achieve 1.1 mass % as RE$_2$O$_3$. Thereafter, the catalyst particles are dried by a drier at an atmospheric temperature of 135° C. Thus, a catalyst a1 is obtained.

c. Specific Surface Area

The above-mentioned specific surface area measurement is performed on the catalyst a1 that had been pseudo-equilibrated, and the area is found to be 223 m²/g. The surface area of the matrix components is 31 m²/g and the specific surface area of the zeolite component is 192 m²/g.

<Catalyst a2> a. Preparation Step 2941 g of water glass (SiO$_2$ concentration: 17 mass %) and 1059 g of sulfuric acid (sulfuric acid concentration: 25 mass %) are added simultaneously and continuously to prepare 4000 g of silica sol (one example of the silica-based binder) with an SiO$_2$ concentration of 12.5 mass %. To this silica sol, 1042 g of kaolin (solid matter concentration: 84 mass %) and 309 g of active alumina powder (solid matter: 81 mass %) are added, and further 2652 g of slurry of an ultra-stable Y-type zeolite (UCS: 2.458 nm, solid matter concentration: 33 mass %) with its pH adjusted to 3.9 by sulfuric acid is added. Thus, a slurry mixture is prepared.

b. Spray-Drying, Cleaning, and Drying Steps

The slurry mixture is turned into droplets and spray-dried by a spray dryer having an inlet temperature of 230° C. and an outlet temperature of 130° C. to obtain spherical particles with an average particle size of 70 μm. The obtained spray-dried particles are suspended in 10 times their amount by mass of warm water (60° C.) and filtered to dehydrate. Then, the particles are poured with 10 times their amount by mass of warm water (60° C.), further suspended, brought into contact with an aqueous solution of rare earth metal (RE) chloride (containing chlorides of cerium and lanthanum), and ion exchange is performed so as to achieve 1.1 mass % as $RE_2O_3$. Thereafter, the catalyst particles are dried by a drier at an atmospheric temperature of 135° C. Thus, a catalyst a2 is obtained.

c. Specific Surface Area

The above-mentioned specific surface area measurement is performed on the catalyst a2 that had been pseudo-equilibrated, and the area is found to be 181 $m^2/g$. The surface area of the matrix components is 149 $m^2/g$ and the specific surface area of the zeolite component is 32 $m^2/g$.

<Catalyst b1> a. Preparation Step 447 g of an aqueous solution containing 23.5 mass % of basic aluminum chloride and 1075 g of pure water are mixed. Then, while this mixed solution is thoroughly stirred, 530 g of kaolin (solid matter concentration: 84 mass %), 247 g of active alumina powder (solid matter concentration: 81 mass %), and 294 g of powder of an RE-exchanged ultra-stable Y-type zeolite ($RE_2O_3$: 11.2 mass %, UCS: 2.460 nm, solid matter concentration: 85 mass %) are sequentially added. Then, the resulting solution is thoroughly stirred to obtain a slurry mixture. The obtained slurry mixture is subjected to a dispersion treatment using a homogenizer, which resulted in a solid matter concentration of 38 mass %.

b. Spray-Drying, Baking, Cleaning, and Drying Steps

The slurry mixture thus obtained is turned into droplets and spray-dried by a spray dryer having an inlet temperature of 230° C. and an outlet temperature of 130° C. to obtain spherical particles with an average particle size of 70 μm. This dry powder is baked in an electric furnace in an air atmosphere at 400° C. for an hour, and then the baked product is suspended in 10 times its amount by mass of warm water (60° C.) and filtered to dehydrate. Further, the product is poured with 10 times its amount by mass of warm water (60° C.), and the cake is collected and dried for 10 hours in a drier with an atmospheric temperature kept at 140° C. Thus, a catalyst b1 is obtained.

c. Specific Surface Area

The above-mentioned specific surface area measurement is performed on the catalyst b1 that had been pseudo-equilibrated, and the area is found to be 167 $m^2/g$. The surface area of the matrix components is 90 $m^2/g$ and the specific surface area of the zeolite component is calculated to be 77 $m^2/g$.

<Catalyst b2> a. Preparation Step

This step is performed in the same manner as the preparation step of the catalyst b1, except that the zeolite powder is changed to powder of an RE-exchanged ultra-stable Y-type zeolite ($RE_2O_3$: 18.2 mass %, UCS: 2.476 nm, solid matter concentration: 85 mass %).

b. Spray-Drying, Baking, Cleaning, and Drying Steps

The same spray-drying, baking, cleaning, and drying steps as those of the catalyst b1 are performed to obtain a catalyst b2.

c. Specific Surface Area

The above-mentioned specific surface area measurement is performed on the catalyst b2 that has been pseudo-equilibrated, and the area is found to be 159 $m^2/g$. The surface area of the matrix components is 86 $m^2/g$ and the specific surface area of the zeolite component is calculated to be 73 $m^2/g$.

<Catalyst b3> a. Preparation Step

This step is performed in the same manner as the preparation step of the catalyst a1.

b. Spray-Drying, Baking, Cleaning, and Drying Steps

The same steps as those of the catalyst a1, except that ion exchange is performed so as to achieve 2.5 mass % as $RE_2O_3$, are performed to obtain a catalyst b3.

c. Specific Surface Area

The above-mentioned specific surface area measurement is performed on the catalyst b3 that had been pseudo-equilibrated, and the area is found to be 217 $m^2/g$. The surface area of the matrix components is 29 $m^2/g$ and the specific surface area of the zeolite component is calculated to be 188 $m^2/g$.

<Catalyst Blend a1b1>

The obtained catalyst a1 and catalyst b1 are blended at a ratio of 50 parts by mass as solid matter of the former to 50 parts by mass as solid matter of the latter. Thus, a catalyst blend a1b1 according to the first embodiment of the present invention is obtained.

<Catalyst Blend a1b2>

The obtained catalyst a1 and catalyst b2 are blended at a ratio of 50 parts by mass as solid matter of the former to 50 parts by mass as solid matter of the latter. Thus, a catalyst blend a1b2 according to the first embodiment of the present invention is obtained.

<Catalyst Blend a2b1>

The obtained catalyst a2 and catalyst b1 are blended at a ratio of 50 parts by mass as solid matter of the former to 50 parts by mass as solid matter of the latter. Thus, a catalyst blend a2b1 according to the first embodiment of the present invention is obtained.

<Catalyst Blend a1b3>

The obtained catalyst a1 and catalyst b3 are blended at a ratio of 50 parts by mass as solid matter of the former to 50 parts by mass as solid matter of the latter. Thus, a catalyst blend a1b3 according to the first embodiment of the present invention is obtained.

Comparative Example

<Catalyst Blend b3b1>

The obtained catalyst b3 and catalyst b1 are blended at a ratio of 50 parts by mass as solid matter of the former to 50 parts by mass as solid matter of the latter. Thus, a catalyst blend b3b1 of a comparative example is obtained.

[Catalytic Activity Evaluation Test]

<Performance Evaluation Test>

A catalytic performance evaluation test with the same raw oil and the same reaction conditions is performed using ACE-MAT for each single catalyst and each catalyst blend according to the above-described manufacturing example. Before evaluation, all the catalysts and catalyst blends are subjected to a pseudo-equilibration treatment by being held at 790° C. for 13 hours under a 100% water vapor condition.

The operation conditions for the performance evaluation test are as follows:
Reaction temperature: 520° C.
Regeneration temperature: 700° C.
Raw oil: Hydrodesulfurized vacuum gas oil (DSVGO) 100%
Catalyst/oil ratio: 3.75 and 5.00 mass %/mass %, where Conversion ratio (mass %)=$(A-B)/A \times 100$ A: Mass of raw oil
B: Mass of distillates of 216° C. or higher in produced oil Hydrogen (mass %)=$C/A \times 100$ C: Mass of hydrogen in produced gas C1+C2(mass %)=$D/A \times 100$ D: Masses of C1 (methane) and C2 (ethane and ethylene) in produced gas LPG (liquefied petroleum gas, mass %)=$E/A \times 100$ E: Masses of propane, propene, butane, and butene in produced gas Gasoline (mass %)=$F/A \times 100$ F: Mass of gasoline (boiling point range: C5 to 216° C.) in produced oil LCO (mass %)=$G/A \times 100$ G: Mass of light cycle oil (boiling point range: 216 to 343° C.) in produced oil HCO (mass %)=$H/A \times 100$ H: Mass of heavy cycle oil (boiling point range: 343° C. or higher) in produced oil Coke (mass %)=$I/A \times 100$ I: Mass of coke having deposited on a catalyst blend (i–C4/C4=) ratio=mass of isobutane/mass of butene Table 1 shows the results of the catalytic activity evaluation test of the single catalysts a1, a2, b1, b2, and b3 prepared as described above. The (i–C4/C4=) ratio in Table 1 represents the mass of isobutane/the mass of butene at the catalyst/oil ratio of 3.75.

TABLE 1

|  | Single catalyst a1 | Single catalyst a2 | Single catalyst a3 | Single catalyst b1 | Single catalyst b3 |
|---|---|---|---|---|---|
| (i − C4/C4 =) ratio | 0.55 | 0.64 | 0.80 | 0.82 | 1.30 |
| Conversion ratio (mass %) (C/O = 5.00) (mass %) | 76.50 | 76.73 | 78.61 | 80.48 | 81.00 |
| Yield at the same conversion ratio (77%) |  |  |  |  |  |
| Hydrogen (mass %) | 0.07 | 0.06 | 0.05 | 0.10 | 0.07 |
| C1 + C2 (mass %) | 1.64 | 1.53 | 1.58 | 1.53 | 1.54 |
| LPG (mass %) | 20.49 | 20.53 | 18.86 | 18.78 | 18.53 |
| Gasoline (mass %) | 52.18 | 51.54 | 53.82 | 53.65 | 54.55 |
| LCO (mass %) | 14.96 | 14.72 | 14.94 | 16.06 | 15.54 |
| HCO (mass) | 8.04 | 8.19 | 8.06 | 6.94 | 7.46 |
| Coke (mass %) | 2.62 | 3.44 | 2.69 | 2.93 | 2.30 |

Table 2 shows the results of the catalytic activity evaluation test of the catalyst blend a1b1 (mass ratio of a1:b1=50:50), the catalyst blend a1b2 (mass ratio of a1:b2=50:50), the catalyst blend a2b1 (mass ratio of a2:b1=50:50), and the catalyst blend a1b3 (mass ratio of a1:b3=50:50) according to the first embodiment of the present invention prepared as described above, and the catalyst blend b3b1 (mass ratio of b3:b1=50:50) of the comparative example prepared as described above. As shown next to one another in Table 2, the differences in (i–C4/C4=) ratio between the single catalysts of the catalyst blends according to the first embodiment of the present invention are 0.18 to 0.75, while the difference in (i–C4/C4=) ratio between the single catalysts b3 and b1 of the catalyst blend b3b1 of the comparative example is 0.02 and thus almost non-existent.

TABLE 2

|  | a1b1 | a1b2 | a2b1 | a1a3 | a3b1 |
|---|---|---|---|---|---|
| Blend composition ratio | 50:50 | 50:50 | 50:50 | 50:50 | 50:50 |
| Difference in (i − C4/C4 =) ratio | 0.26 | 0.75 | 0.18 | 0.25 | 0.02 |
| Conversion ratio (C/O = 5.00) (mass %) | 79.19 | 80.11 | 79.12 | 78.34 | 79.35 |
| Yield at the same conversion ratio (77%) |  |  |  |  |  |
| Hydrogen (mass %) | 0.09 | 0.09 | 0.07 | 0.07 | 0.07 |
| C1 + C2 (mass %) | 1.55 | 1.55 | 1.49 | 1.58 | 1.56 |
| LPG (mass %) | 18.99 | 18.92 | 19.30 | 19.06 | 18.95 |
| Gasoline (mass %) | 53.66 | 54.10 | 53.29 | 53.83 | 53.44 |
| LCO (mass %) | 15.59 | 14.94 | 15.76 | 14.87 | 15.41 |
| HCO (mass %) | 7.41 | 8.06 | 7.24 | 8.13 | 7.59 |
| Coke (mass %) | 2.71 | 2.34 | 2.84 | 2.46 | 2.98 |
| Remarks | Invention Example | Invention Example | Invention Example | Invention Example | Comparative Example |

Figure 2:
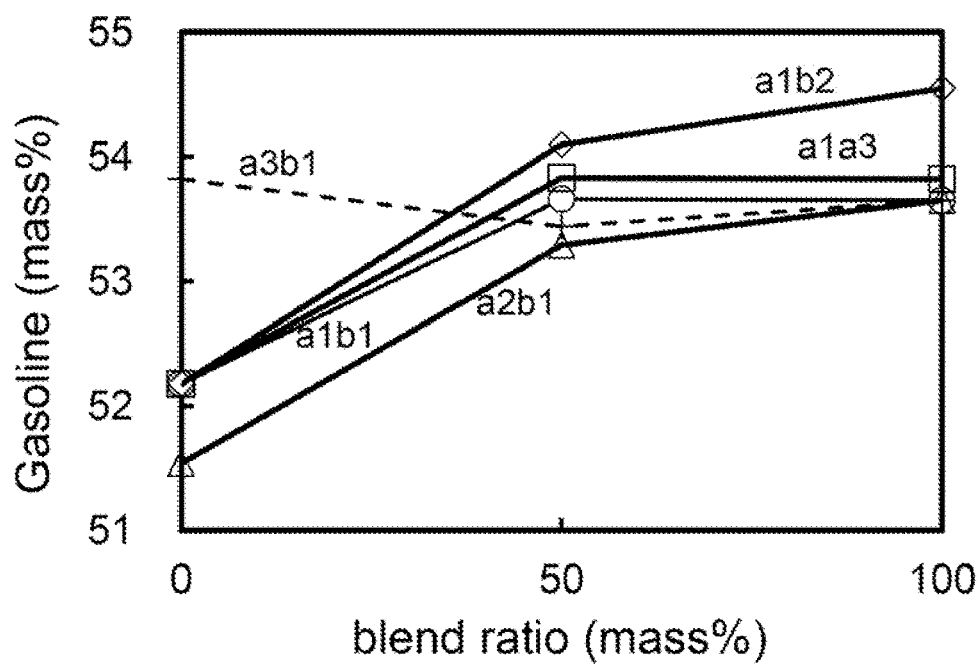
FIG. 2 is a graph showing how the blend ratios of the catalysts according to the embodiment influence a gasoline yield.
Figure 3:
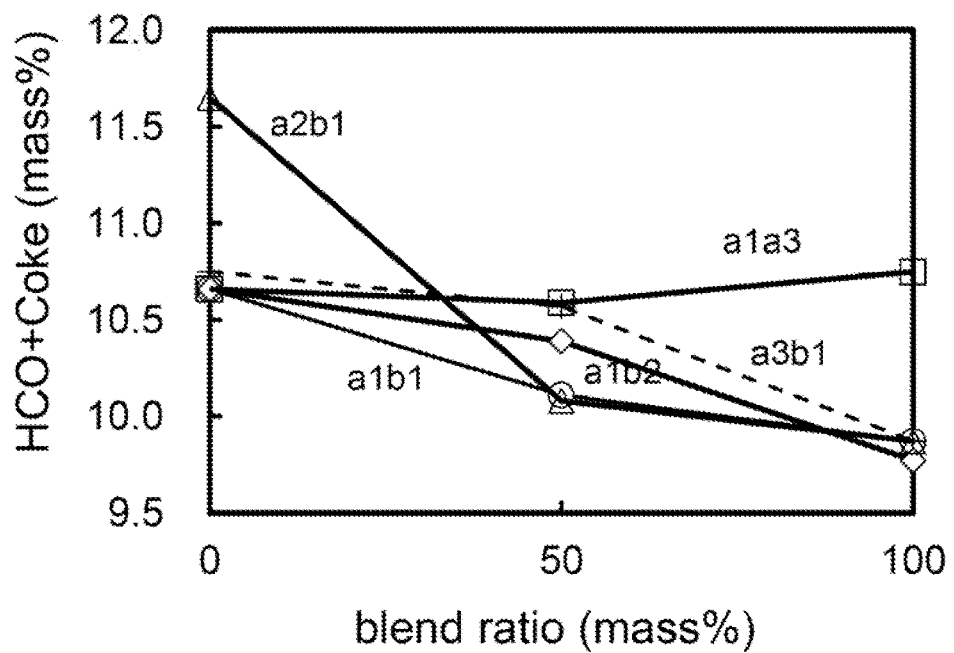
FIG. 3 is a graph showing how the blend ratios of the catalysts according to the embodiment influence an HCO+ coke yield.

These test results are organized and shown in FIG. 1, FIG. 2, and FIG. 3. FIG. 1 shows relationships between the blend ratios of the catalyst blends and the coke yield. The abscissa represents the percentage of the ratio of one catalyst of each catalyst blend that has a higher hydrogen transfer reaction activity. All the catalyst blends of the examples of the present invention have a downward convex curve, which shows that blending equal amounts of catalysts results in a lower coke yield than the arithmetic means of the single catalysts. By contrast, the catalyst blend b3b1 of the comparative example has an upward convex curve, which shows that blending the catalysts results in a higher coke yield than the yields of the single catalysts. Like FIG. 1, FIG. 2 is a graph with the blend ratio and the gasoline yield plotted on the abscissa and the ordinate, respectively. All the catalyst blends of the examples of the present invention have an upward convex curve, which shows that the gasoline yield is higher than the arithmetic means of the single catalysts. By contrast, the catalyst blend b3b1 of the comparative example has a downward convex curve, which shows that blending the catalysts results in a lower gasoline yield than the yields of the single catalysts. Like FIG. 1, FIG. 3 is a graph with the blend ratio and the HCO+coke yield plotted on the abscissa and the ordinate, respectively. All the catalyst blends of the examples of the present invention, except for the catalyst blend a2b1, have a downward convex curve, which shows that both heavy oil cracking and low coke level are achieved. The catalyst blend of the comparative example has an upward convex curve, and no improvement by blending is seen. A possible reason why the catalyst blend a2b1 has no effect of blending on the heavy oil cracking is that the difference in hydrogen transfer reaction activity is too large.

Manufacturing Example 2

<Catalyst c1> a. Preparation Step 2941 g of water glass ($SiO_2$ concentration: 17 mass %) and 1059 g of sulfuric acid (sulfuric acid concentration: 25 mass %) are added simultaneously and continuously to prepare 4000 g of silica sol (one example of the silica-based binder) with an $SiO_2$ concentration of 12.5 mass %. To this silica sol, 893 g of kaolin (solid matter concentration: 84 mass %) and 556 g of active alumina powder (solid matter: 81 mass %) are added, and further 2424 g of slurry of an ultra-stable Y-type zeolite (solid matter concentration: 33 mass %) with its pH adjusted to 3.9 by sulfuric acid is added. Thus, a slurry mixture is prepared.

b. Spray-Drying, Cleaning, and Drying Steps

The slurry mixture is turned into droplets and spray-dried by a spray dryer having an inlet temperature of 230° C. and an outlet temperature of 130° C. to obtain spherical particles with an average particle size of 70 μm. The obtained spray-dried particles are suspended in 10 times their amount by mass of warm water (60° C.) and filtered to dehydrate. Then, the particles are poured with 10 times their amount by mass of warm water (60° C.), further suspended, brought into contact with an aqueous solution of rare earth metal (RE) chloride (containing chlorides of cerium and lanthanum), and ion exchange is performed so as to achieve 2.1 mass % as $RE_2O_3$. Thereafter, the catalyst particles are dried by a drier at an atmospheric temperature of 135° C. Thus, a catalyst c1 is obtained.

c. Pseudo-Equilibration Step

The catalyst c1 thus obtained is baked in advance at an atmospheric temperature of 600° C. for two hours. Then, nickel octyl acid salt and vanadium octyl acid salt are deposited on the baked catalyst particles, respectively in amounts, as converted to metal amounts, of 1000 ppm (the mass of nickel is divided by the mass of the catalyst) and 2000 ppm (the mass of vanadium is divided by the mass of the catalyst). Then, the catalyst is dried at an atmospheric temperature of 110° C. and baked at an atmospheric temperature of 600° C. for 1.5 hours. Thereafter, the catalyst is subjected to a steaming treatment for 13 hours at an atmospheric temperature of 780° C. Thus, the pseudo-equilibrated catalyst c1 is obtained.

d. Measurement of Pore Size and Pore Volume Distribution

The pore size and pore volume distribution of the pseudo-equilibrated catalyst c1 is measured by the above-mentioned mercury intrusion technique. The pseudo-equilibrated catalyst c1 is baked at an atmospheric temperature of 600° C. for an hour before measurement. The total pore volume is 0.28 ml/g. The ratio PV1/PV2 of the volume (PV1) of mesopores having a pore size not smaller than 4 nm nor larger than 50 nm to the volume (PV2) of macropores having a pore size larger than 50 nm is 0.56. FIG. 4 shows the distribution of a log-differentiated pore volume dV/d log d relative to the pore size [nm] of the pseudo-equilibrated catalyst c1.

e. Specific Surface Area

The above-mentioned specific surface area measurement is performed on the pseudo-equilibrated catalyst c1, and the area is found to be 169 m$^2$/g. The surface area of the matrix components is 48 m$^2$/g and the specific surface area of the zeolite component is 121 m$^2$/g.

<Catalyst d1> a. Preparation Step 531.9 g of an aqueous solution containing 23.5 mass % of basic aluminum chloride and 1138.0 g of pure water are mixed. Then, while this mixed solution is thoroughly stirred, 452.4 g of kaolin (solid matter concentration: 84 mass %), 246.9 g of active alumina powder (solid matter concentration: 81 mass %), and 333.3 g of powder of an ultra-stable Y-type zeolite (solid matter concentration: 75 mass %) are sequentially added. Then, 154.6 g of a lanthanum chloride solution ($La_2O_3$ concentration: 29.1 mass %) is added and the resulting solution is thoroughly stirred. Thus, a slurry mixture is prepared. The obtained slurry mixture is subjected to a dispersion treatment using a homogenizer, which results in a solid matter concentration of 35 mass % and pH of 3.8.

b. Spray-Drying, Baking, Cleaning, and Drying Steps

The slurry mixture thus obtained is turned into droplets and spray-dried by a spray dryer having an inlet temperature of 230° C. and an outlet temperature of 130° C. to obtain spherical particles with an average particle size of 70 μm. This dry powder is baked in an electric furnace in an air atmosphere at 400° C. for an hour, and then the baked product is suspended in 10 times its amount by mass of warm water (60° C.) and filtered to dehydrate. Further, the product is poured with 10 times its amount by mass of warm water (60° C.), and the cake is collected and dried for 10 hours in a drier with an atmospheric temperature kept at 140° C. Thus, a catalyst d1 is obtained.

c. Pseudo-Equilibration Step

The obtained catalyst d1 is subjected to a pseudo-equilibration treatment using the same conditions as those of the catalyst c1.

d. Measurement of Pore Size and Pore Volume Distribution

The pore size and pore volume distribution of the pseudo-equilibrated catalyst d1 is measured by the above-mentioned mercury intrusion technique in the same manner as the catalyst c1. The total pore volume is 0.39 ml/g. The ratio PV1/PV2 of the volume (PV1) of mesopores having a pore size not smaller than 4 nm nor larger than 50 nm to the volume (PV2) of macropores having a pore size larger than 50 nm is 1.53. The ratio PV4/PV3 of the volume (PV4) of pores having a pore size not smaller than 30 nm nor larger than 100 nm to the volume (PV3) of pores having a pore size larger than 4 nm is 0.11. FIG. 4 shows the distribution of a log-differentiated pore volume dV/d log d relative to the pore size [nm] of the pseudo-equilibrated catalyst d1.

e. Specific Surface Area

The above-mentioned specific surface area measurement is performed on the pseudo-equilibrated catalyst d1, and the area is found to be 166 m$^2$/g. The surface area of the matrix components is 90 m$^2$/g and the specific surface area of the zeolite component is calculated to be 76 m$^2$/g.

<Catalyst Blend c1d1>

The obtained catalyst c1 and catalyst d1 are blended at a ratio of 100 parts by mass as solid matter of the former to 42.9 parts by mass and 100 parts by mass as solid matter of the latter. Thus, a catalyst blend c1d1 according to the second embodiment of the present invention is obtained.

Comparative Example

<Catalyst R1> a. Preparation Step 531.9 g of an aqueous solution containing 23.5 mass % of basic aluminum chloride and 299.3 g of pure water are mixed. Then, while this mixed solution is thoroughly stirred, 452.4 g of kaolin (solid matter concentration: 84 mass %), 61.7 g of active alumina powder (solid matter concentration: 81 mass %), 1500 g of slurry of active alumina (boehmite gel slurry; solid matter concentration: 10 mass %) with its pH adjusted to 3.1 by sulfuric acid in advance, and 333.3 g of powder of an ultra-stable Y-type zeolite (solid matter concentration: 75 mass %) are sequentially added. Then, 154.6 g of a lanthanum chloride solution (La$_2$O$_3$ concentration: 29.1 mass %) is added and the resulting solution is thoroughly stirred. Thus, a slurry mixture is obtained. The obtained slurry mixture is subjected to a dispersion treatment using a homogenizer, which results in a solid matter concentration of 30 mass % and pH of 3.4.

b. Spray-Drying, Baking, Cleaning, and Drying Steps

The slurry mixture is turned into droplets and spray-dried by a spray dryer having an inlet temperature of 230° C. and an outlet temperature of 130° C. to obtain spherical particles with an average particle size of 68 μm. This dry powder is baked in an electric furnace in an air atmosphere at 400° C. for an hour, and then the baked product is suspended in 10 times its amount by mass of warm water (60° C.) and filtered to dehydrate. Further, the product is poured with 10 times its amount by mass of warm water (60° C.), and the cake is collected and dried for 10 hours in a drier with an atmospheric temperature kept at 140° C. Thus, a catalyst R1 is obtained.

c. Pseudo-Equilibration Step

The obtained catalyst R1 is subjected to a pseudo-equilibration treatment using the same conditions as those of the catalyst c1.

d. Measurement of Pore Size and Pore Volume Distribution

The pore size and pore volume distribution of the pseudo-equilibrated catalyst R1 is measured by the above-described mercury intrusion technique, in the same manner as the catalyst c1. The total pore volume is 0.31 ml/g. The ratio PV1/PV2 of the volume (PV1) of mesopores having a pore size not smaller than 4 nm nor larger than 50 nm to the volume (PV2) of macropores having a pore size larger than 50 nm is 1.14. The ratio PV4/PV3 of the volume (PV4) of pores having a pore size not smaller than 50 nm nor larger than 100 nm to the volume (PV3) of pores having a pore size larger than 4 nm is 0.25. FIG. 4 shows the distribution of a log-differentiated pore volume dV/d log d relative to the pore size [nm] of the pseudo-equilibrated catalyst R1.

e. Specific Surface Area

The above-mentioned specific surface area measurement is performed on the pseudo-equilibrated catalyst R1, and the area is found to be 160 m$^2$/g. The surface area of the matrix components is 87 m$^2$/g and the specific surface area of the zeolite component is calculated to be 73 m$^2$/g.

<Catalyst Blend c1R1>

The obtained catalyst c1 and catalyst R1 are blended at a ratio of 100 parts by mass as solid matter of the former to 42.9 parts by mass as solid matter of the latter. Thus, a catalyst blend c1R1 of a comparative example is obtained.

[Catalytic Activity Evaluation Test]

<Performance Evaluation Test>

A catalytic performance evaluation test with the same raw oil and the same reaction conditions is performed using advanced cracking evaluation-micro activity test (ACE-MAT) for each of the single catalysts and the catalyst blends according to the above-described manufacturing example and comparative example. Before evaluation, all the catalysts and catalyst blends are subjected to the above-described pseudo-equilibration treatment.

The operation conditions for the performance evaluation test are as follows:

Reaction temperature: 520° C.
Regeneration temperature: 700° C.
Raw oil: Desulfurized atmospheric residual oil (DSAR) 50%:
hydrodesulfurized vacuum gas oil (DSVGO) 50%
Catalyst/oil ratio: 7 mass %/mass %, where Conversion ratio (mass %)=$(A-B)/A \times 100$ A: Weight of raw oil
B: Weight of distillates of 216° C. or higher in produced oil Hydrogen (mass %)=$C/A \times 100$ C: Weight of hydrogen in produced gas C1+C2 (mass %)=$D/A \times 100$ D: Weights of C1 (methane) and C2 (ethane and ethylene) in produced gas LPG (liquefied petroleum gas, mass %)=$E/A \times 100$ E: Weights of propane, propylene, butane, and butylene in produced gas Gasoline (mass %)=$F/A \times 100$ F: Weight of gasoline (boiling point range: C5 to 216° C.) in produced oil LCO (mass %)=$G/A \times 100$ G: Weight of light cycle oil (boiling point range: 216 to 343° C.) in produced oil HCO (mass %)=$H/A \times 100$ H: Weight of heavy cycle oil (boiling point range: 343° C. or higher) in produced oil Coke (mass %)=$I/A \times 100$ I: Weight of coke having deposited on the catalyst blend Table 3 shows the results of the catalytic activity evaluation test of the single catalysts c1, d1, and R1 prepared as described above.

TABLE 3

|  | Single catalyst c1 | Single catalyst d1 | Single catalyst R1 |
|---|---|---|---|
| PV1/PV2 | 0.56 | 1.53 | 1.14 |
| PV4/PV3 | — | 0.11 | 0.25 |
| Conversion ratio (C/O = 5) (mass %) | 75.2 | 77.3 | 76.9 |
| Yield at the same conversion ratio |  |  |  |
| Hydrogen (mass %) | 0.4 | 0.7 | 0.7 |
| C1 + C2 (mass %) | 2.0 | 2.2 | 2.2 |
| LPG (mass %) | 15.4 | 15.4 | 15.0 |
| Gasoline (mass %) | 50.2 | 49.7 | 49.9 |
| LCO (mass %) | 16.4 | 16.1 | 16.5 |
| HCO (mass %) | 8.4 | 6.6 | 6.6 |
| Coke (mass %) | 7.1 | 9.3 | 9.1 |

Figure 5:
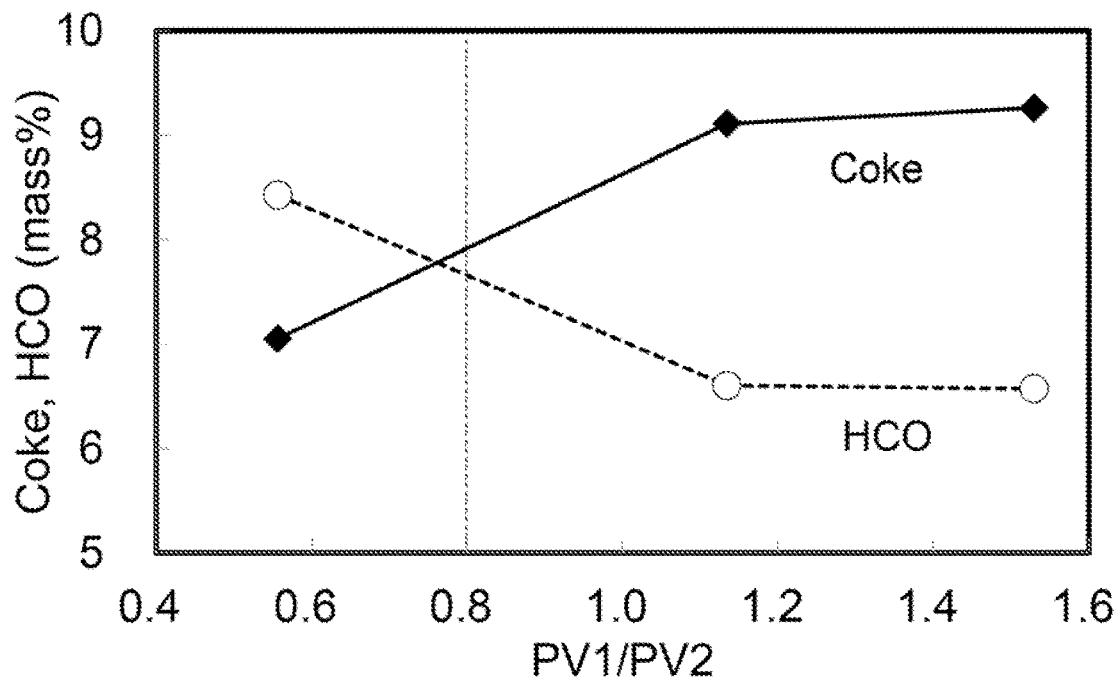
FIG. 5 is a graph showing how pore size and pore volume distributions (PV1/PV2) of the catalysts according to the other embodiment influence cracking of hydrocarbon oil.

The results of Table 3 show that if (PV1/PV2) is lower than 0.8, the coke yield becomes low and the HCO yield becomes high. If (PV1/PV2) is not lower than 0.8, conversely the coke yield becomes high and the HCO yield becomes low. FIG. 5 shows the results of Table 3 with (PV1/PV2) and the coke and HCO yield plotted on the abscissa and the ordinate, respectively.

Table 4 shows the results of the catalytic activity evaluation test of the catalyst blend c1d1 (mass ratio of c1:d1=70:30 and 50:50) according to the second embodiment of the present invention prepared as described above, and the catalyst blend c1R1 (mass ratio of c1:R1=70:30) of the comparative example prepared as described above.

TABLE 4

|  | c1d1 | c1d1 | c1R1 |
|---|---|---|---|
| Blend composition ratio | 70:30 | 50:50 | 70:30 |
| PV4/PV3 (d1 or R1) | 0.11 | 0.11 | 0.25 |
| Conversion ratio (C/O = 5) (mass %) | 76.2 | 76.7 | 76.9 |
| Yield at the same conversion ratio |  |  |  |
| Hydrogen (mass %) | 0.5 | 0.6 | 0.5 |
| C1 + C2 (mass %) | 2.0 | 2.1 | 2.1 |
| Gasoline + LPG (mass %) | 65.9 | 66.2 | 66.0 |
| LCO (mass %) | 16.4 | 16.5 | 16.2 |
| HCO (mass %) | 7.4 | 6.7 | 7.8 |
| Coke (mass %) | 7.8 | 7.8 | 7.4 |
| Remarks |  | Invention Example |  |

Figure 6:
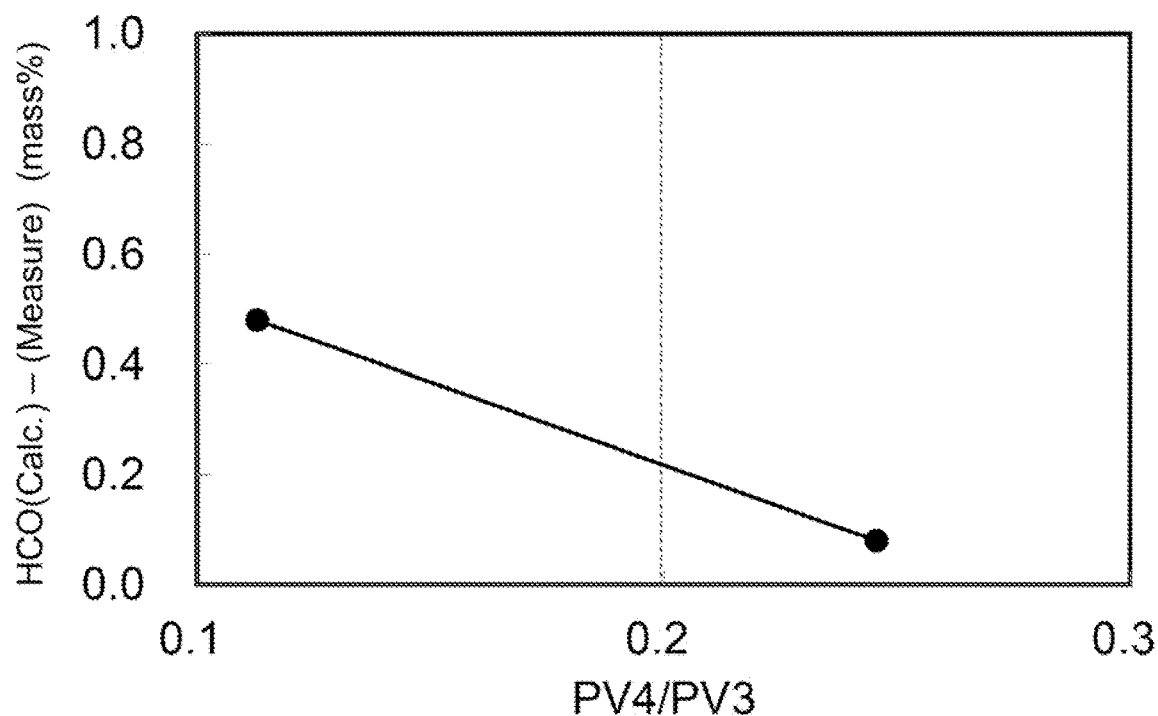
FIG. 6 is a graph showing how pore size and pore volume distributions (PV4/PV3) of the catalysts according to the other embodiment influence the crude oil cracking performance of a catalyst blend.

The results of Table 4 show that if the blend ratio with the catalyst c1 (70:30) is equal, the catalyst blend c1d1 using the catalyst d1 of which (PV4/PV3) is not higher than 0.2 can further reduce the HCO yield, i.e., further crack the heavy oil, than c1R1. FIG. 6 shows the results of Table 2, with (PV4/PV3) plotted on the abscissa and the difference between the HCO yield of the catalyst blend calculated from the single catalysts and the measured HCO yield plotted on the ordinate. It can be seen that (PV4/PV3) not higher than 0.2 makes the catalyst blend more effective in cracking heavy oil than the calculated value and is therefore preferable.

Figure 7:
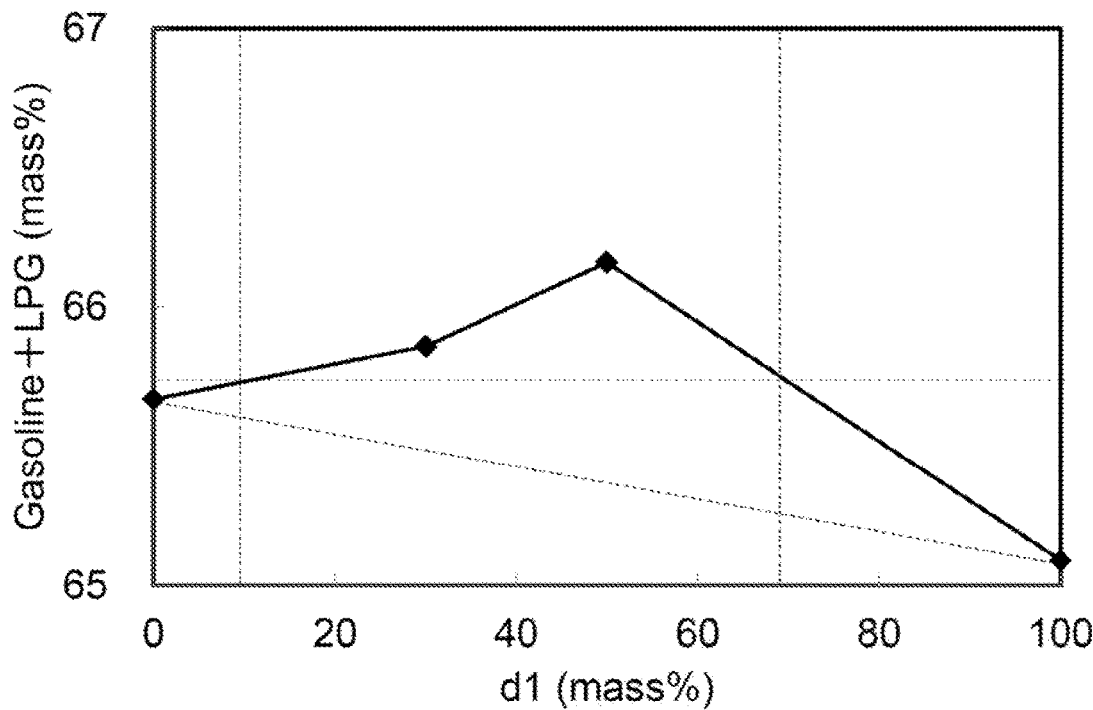
FIG. 7 is a graph showing how the blend ratio of the catalysts according to the other embodiment influences a gasoline+LPG yield.

FIG. 7 shows how the blend ratio of the catalysts c1 and d1 influences the gasoline+LPG yield that are high-value-added products. It can be seen that the catalyst blend has a higher gasoline+LPG yield that are high-value-added products than the single catalysts, and that, in particular, the catalyst blend has a high yield of high-value-added products (products) than the single catalysts if the ratio of d1 to the entire catalyst blend is 9 mass % to 66 mass % (a ratio of 100 parts by mass of the catalyst c1 to 10 to 200 parts by mass of d1).

Figure 8:
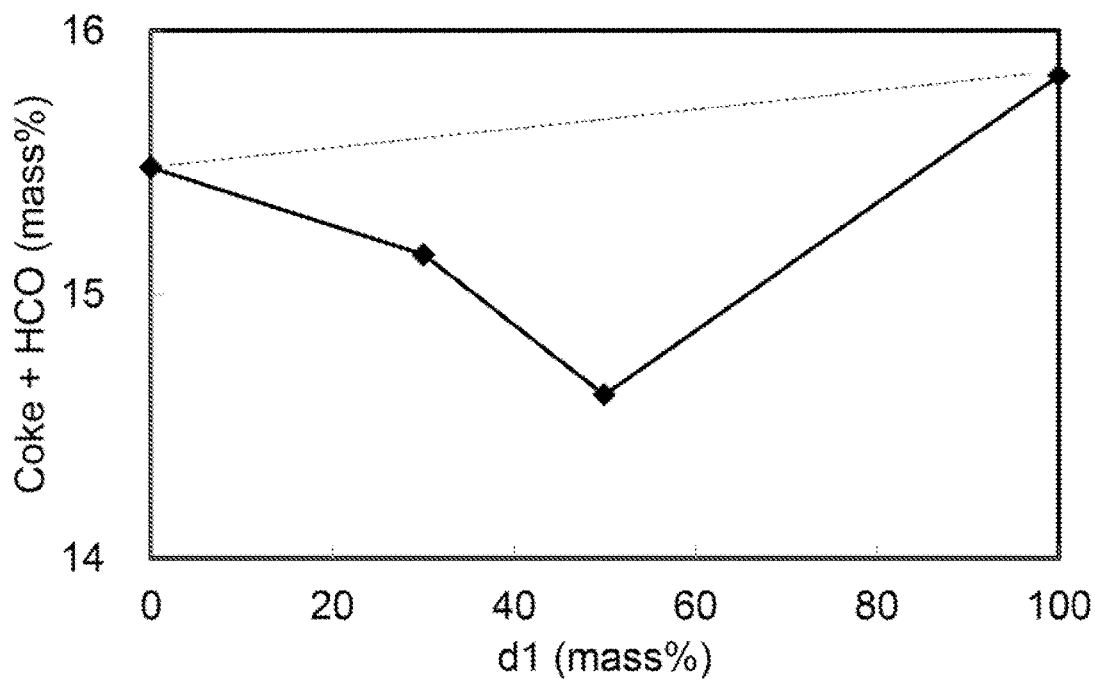
FIG. 8 is a view showing how the blend ratio of the catalysts according to the other embodiment influences a coke+HCO yield.

FIG. 8 shows how the blend ratio of the catalysts c1 and d1 influences the coke+HCO yield. The catalyst blend has a clearly lower coke+HCO yield than the single catalysts, and thus has high performance in converting heavy distillates into gasoline and LPG that are high-value-added products.

As has been described above, the catalyst blends of the present invention can particularly increase the yields of gasoline and LPG that are high-value-added products and can also reduce the coke yield while reducing heavy distillates.

The invention claimed is:

1. A fluid catalytic cracking catalyst for hydrocarbon oil comprising a blend of two fluid catalytic cracking catalyst components each of which has a different hydrogen transfer reaction activity or has a pore distribution within a specific range, wherein these catalyst components are not pseudo-equilibrated, wherein
a first catalyst component contains a zeolite and matrix components,
a second catalyst component contains a zeolite and matrix components, and
the fluid catalytic cracking catalyst is composed of the first catalyst component and the second catalyst component blended at a mass ratio within a range of 10:90 to 90:10,
the fluid catalytic cracking catalyst being selected from one of blends I and II:
I) the first catalyst component comprises a catalyst (1) containing a faujasite-type zeolite (A) having a lattice constant within a range of 2.435 to 2.459 nm, matrix components, and 0.5 to 2.0 mass % of a rare earth as $RE_2O_3$ based on the catalyst (1) composition;
the second catalyst component comprises a catalyst (2) containing a faujasite-type zeolite (B) having a lattice constant within a range of 2.440 to 2.478 nm, matrix components, and 2.5 to 12 mass % of a rare earth as $RE_2O_3$ based on the catalyst (2) composition; and
the hydrogen transfer reaction activity of the catalyst (1) is lower than the hydrogen transfer reaction activity of the catalyst (2);
II) the first catalyst component comprises a catalyst (3) that has a pore distribution in which a ratio (PV1/PV2) of a volume (PV1) of pores having a pore size not smaller than 4 nm nor larger than 50 nm to a volume (PV2) of pores having a pore size larger than 50 nm is lower than 0.8;
the second catalyst component comprises a catalyst (4) that has a pore distribution in which: (a) a ratio (PV1/PV2) of a volume (PV1) of pores having a pore size not smaller than 4 nm nor larger than 50 nm to a volume (PV2) of pores having a pore size larger than 50 nm is not lower than 0.8; and (b) a ratio (PV4/PV3) of a volume (PV4) of pores having a pore size not smaller than 30 nm nor larger than 100 nm to a volume (PV3) of pores having a pore size larger than 4 nm is lower than 0.2;
wherein the hydrogen transfer reaction activity is determined on test portions of the catalyst (1) and the catalyst (2), for testing and evaluation, by first performing pseudo-equilibration I, prior to said testing and evaluation;
wherein the pseudo-equilibration I is performed by being held at 790° C. for 13 hours under a 100% water vapor condition;
wherein the pore distribution is determined on test portions of the catalyst (3) and the catalyst (4), for testing and evaluation, by first performing pseudo-equilibration II, prior to said testing and evaluation; and wherein the pseudo-equilibration II is performed by baking each of the catalyst (3) and the catalyst (4) at an atmospheric temperature of 600° C. for two hours, followed by depositing nickel octyl acid salt and vanadium octyl acid salt on the baked catalyst particles, respectively, such that nickel metal is present in an amount of 1000 ppm and vanadium metal in an amount of 2000 ppm, obtained by the mass of nickel or vanadium divided by the mass of the catalyst, followed by drying the catalyst at an atmospheric temperature of 110° C. and baking at an atmospheric temperature of 600° C. for 1.5 hours, and lastly subjecting each of the catalyst (3) and the catalyst (4) to a steaming treatment for 13 hours at an atmospheric temperature of 780° C.

2. The fluid catalytic cracking catalyst for hydrocarbon oil according to claim 1, wherein in the blend (I), the hydrogen transfer reaction activity of each catalyst is determined by a ratio of i-C4 over C4= in a test, where i-C4 and C4= represent masses of isobutane and butene respectively deposited on each of the first catalyst component and the second catalyst component, and wherein a difference between the ratio of the first catalyst component and the second catalyst component is within a range of 0.10 to 0.85, wherein the test is performed using advanced cracking evaluation-micro activity test (ACE-MAT) under the following conditions:
(i) a reaction temperature: 520° C.,
(ii) regeneration temperature: 700° C.,
(iii) raw oil: Desulfurized atmospheric residual oil (DSAR) 50%: hydrodesulfurized vacuum gas oil (DSVGO) 50%,
(iv) catalyst/oil ratio: 7 mass %/mass %.

3. The fluid catalytic cracking catalyst for hydrocarbon oil according to claim 1, wherein
the catalyst (1) contains 15 to 60 mass % of the faujasite-type zeolite (A) based on the catalyst (1) composition, and the catalyst (2) contains 15 to 60 mass % of the faujasite-type zeolite (B) based on the catalyst (2) composition.

4. The fluid catalytic cracking catalyst for hydrocarbon oil according to claim 1, wherein:
the catalyst (3) contains a zeolite and a silica-based binder as a binding agent, and contains 15 to 60 mass % of the zeolite and 5 to 30 mass % of the silica-based binder based on the catalyst (3) composition; and
the catalyst (4) contains a zeolite and an aluminum compound binder as a binding agent, and contains 15 to 60 mass % of the zeolite and 5 to 30 mass % of the aluminum compound binder based on the catalyst (4) composition.

5. The fluid catalytic cracking catalyst for hydrocarbon oil according to claim 4, wherein
the silica-based binder is one or more than one of silica sol, water glass, and an acidic silicate solution.

6. The fluid catalytic cracking catalyst for hydrocarbon oil according to claim 4, wherein the aluminum compound binder contains one type selected from the following (a) to (c):
(a) basic aluminum chloride;
(b) aluminum biphosphate; and
(c) alumina sol.

7. The fluid catalytic cracking catalyst for hydrocarbon oil according to claim 1, wherein the zeolites contained in the catalyst (3) and the catalyst (4) are of one or more than one of the following types: FAU (faujasite), MFI, CHA, and MOR.

8. The fluid catalytic cracking catalyst for hydrocarbon oil according to claim 7, wherein the FAU-type zeolite is one of a hydrogen Y-type zeolite (HY), an ultra-stable Y-type zeolite (USY), a rare-earth-exchanged Y-type zeolite (REY), and a rare-earth-exchanged ultra-stable Y-type zeolite (RE-USY).

9. The fluid catalytic cracking catalyst for hydrocarbon oil according to claim 4, wherein the catalyst (3) and the catalyst (4) contain clay mineral other than the zeolite and the binding agent.

10. A fluid catalytic cracking catalyst for hydrocarbon oil comprising a blend of a catalyst component with another catalyst, the catalyst component being characterized by having, a pore distribution in which:
(a) a ratio (PV1/PV2) of a volume (PV1) of pores having a pore size not smaller than 4 nm nor larger than 50 nm to a volume (PV2) of pores having a pore size larger than 50 nm is not lower than 0.8; and
(b) a ratio (PV4/PV3) of a volume (PV4) of pores having a pore size not smaller than 30 nm nor larger than 100 nm to a volume (PV3) of pores having a pore size larger than 4 nm is lower than 0.2, wherein the catalyst component contains a zeolite and an aluminum compound binder as a binding agent; and wherein the pore distribution is determined on a portion of the catalyst component, for testing and evaluation, by first performing pseudo-equilibration, prior to said testing and evaluation; and wherein the pseudo-equilibration is performed by baking the catalyst component at an atmospheric temperature of 600° C. for two hours, followed by depositing nickel octyl acid salt and vanadium octyl acid salt on the baked catalyst component particles, respectively, such that nickel metal is present in an amount of 1000 ppm and vanadium metal in an amount of 2000 ppm, obtained by the mass of nickel or vanadium divided by the mass of the catalyst, followed by drying the catalyst component at an atmospheric temperature of 110° C. and baking at an atmospheric temperature of 600° C. for 1.5 hours, and lastly subjecting the catalyst component to a steaming treatment for 13 hours at an atmospheric temperature of 780° C.

11. The fluid catalytic cracking catalyst for hydrocarbon oil according to claim 10, wherein the catalyst component contains 15 to 60 mass % of the zeolite and 5 to 30 mass % of the aluminum compound binder based on the catalyst component composition.

12. The fluid catalytic cracking catalyst for hydrocarbon oil according to claim 10, wherein the aluminum compound binder contains one type selected from the following (a) to (c):
(a) basic aluminum chloride;
(b) aluminum biphosphate; and
(c) alumina sol.

13. The fluid catalytic cracking catalyst for hydrocarbon oil according to claim 10, wherein the zeolite contained in the catalyst component is of one or more than one of the following types: FAU (faujasite), MFI, CHA, and MOR.

14. The fluid catalytic cracking catalyst for hydrocarbon oil according to claim 13, wherein the FAU-type zeolite is one of a hydrogen Y-type zeolite (HY), an ultra-stable Y-type zeolite (USY), a rare-earth-exchanged Y-type zeolite (REY), and a rare-earth-exchanged ultra-stable Y-type zeolite (REUSY).

15. The fluid catalytic cracking catalyst for hydrocarbon oil according to claim 10, wherein the catalyst component contains clay mineral other than the zeolite and the binding agent.

* * * * *